United States Patent
Ohkawa et al.

(10) Patent No.: US 9,954,748 B2
(45) Date of Patent: Apr. 24, 2018

(54) ANALYSIS METHOD AND ANALYSIS APPARATUS

(71) Applicant: FUJITSU LIMITED, Kawasaki-shi, Kanagawa (JP)

(72) Inventors: Naoyoshi Ohkawa, Kawasaki (JP); Yuji Nomura, Kawasaki (JP); Fumiyuki Iizuka, Kawasaki (JP); Sumiyo Okada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 595 days.

(21) Appl. No.: 14/520,495

(22) Filed: Oct. 22, 2014

(65) Prior Publication Data

US 2015/0117242 A1 Apr. 30, 2015

(30) Foreign Application Priority Data

Oct. 31, 2013 (JP) .................................. 2013-227208

(51) Int. Cl.
*H04L 12/26* (2006.01)
*H04W 24/04* (2009.01)

(52) U.S. Cl.
CPC ............. *H04L 43/08* (2013.01); *H04W 24/04* (2013.01); *H04L 43/103* (2013.01)

(58) Field of Classification Search
CPC ........ H04L 43/08; H04W 24/02; H04W 24/04
See application file for complete search history.

(56) References Cited

U.S. PATENT DOCUMENTS

2012/0237208 A1    9/2012  Hongo et al.
2014/0068338 A1*   3/2014  Kamble ................ H04L 41/142
                                                            714/37

FOREIGN PATENT DOCUMENTS

JP    2002-118556    4/2002
JP    2011-166270    8/2011
JP    2012-199707    10/2012

* cited by examiner

*Primary Examiner* — Oussama Roudani
(74) *Attorney, Agent, or Firm* — Fujitsu Patent Center

(57) ABSTRACT

In an analysis apparatus, when detecting each packet communicated via a network, an update unit updates statistical information that is stored in a continuous storage area of a storage unit and that indicates the communication state of the network for a first cycle. Then, a first processing unit reads the statistical information from the storage unit at every first cycle, and processes the statistical information and initializes the statistical information in the storage unit. A second processing unit reads partial statistical information that is part of the statistical information from the storage unit at every second cycle shorter than the first cycle, and processes the partial statistical information and initializes the partial statistical information in the storage unit.

8 Claims, 14 Drawing Sheets

ANALYSIS METHOD AND ANALYSIS APPARATUS

CROSS-REFERENCE TO RELATED APPLICATION

This application is based upon and claims the benefit of priority of the prior Japanese Patent Application No. 2013-227208, filed on Oct. 31, 2013, the entire contents of which are incorporated herein by reference.

FIELD

The embodiments discussed herein relate to an analysis method and apparatus that analyze the communication state of a network.

BACKGROUND

There are more and more opportunities to provide service over a network. Service providers, which provide service over a network, monitor the quality of the network to maintain the quality of the service.

The monitoring of the network quality is roughly divided into an analysis function and a statistical function. When each packet arrives, the analysis function analyzes the header information of the packet, so as to detect various kinds of statistical information (the number of packets transmitted and received, the number of bytes transmitted and received, the number of lost packets, a delay time, etc.) for each connection of packets in almost realtime and then store them in a statistical table. At every fixed statistical cycle, the statistical function compiles the information stored in the statistical table, performs a statistical process on the compiling result, and writes the result in a statistical information database. The statistical cycle for conducting the statistics on the statistical information is as short as one minute. There is even a system in which the cycle is as long as one day.

To maintain the service quality, it is important to detect an instantaneous degradation in the network quality. For example, in the network, there are times when the amount of traffic abruptly increases. Such an abrupt increase in the amount of traffic is called bursty traffic.

To detect bursty traffic, statistical information needs to be compiled and statistics needs to be conducted at every cycle of at least milliseconds. Setting the current statistical cycle for packet analysis shorter leads to an increase in the computational cost and the number of packet samples to be used in analysis, and therefore it is difficult to record all statistical information that is obtained at every statistical cycle. For example, in the case of storing statistical information obtained at every 10 milliseconds, the amount of data stored is 6000 times more compared to the case of storing statistical information obtained at every minute. To generate and store such a large amount of statistical information would cause a high processing load and would be unrealistic.

For example, there has been considered a technique of measuring the amount of traffic flowing in a link at an infinitesimal time interval, and storing the measurement result only when the measurement result exceeds a preset threshold or storing only a predetermined number of high-order data pieces. There has also been considered another technique of providing a first memory for storing first statistical information and a second memory for storing second statistical information, separately obtaining the first and second statistical information at predetermined different time cycles, and storing the first statistical information in the first memory and the second statistical information in the second memory.

Please see, for example, Japanese Laid-open Patent Publications Nos. 2002-118556 and 2012-199707.

However, in the technique of storing only statistical information corresponding to a time period satisfying certain conditions out of the statistical information obtained at an infinitesimal time interval, it is not possible to conduct statistics at a relatively long time interval, as is conventionally done. Even if occurrence of bursty traffic is detected by obtaining statistical information at the infinitesimal time interval, it is difficult to appropriately maintain the network quality without managing the quality through the network monitoring at a relatively long time interval.

To deal with the above, there is an idea of providing both a storage function of storing statistical information at an infinitesimal time interval and a storage function of storing statistical information at a relatively long time interval. To this end, a data table (short-term statistical table) for storing statistical information at an infinitesimal time interval and a data table (long-term statistical table) for storing statistical information at a relatively long time interval are prepared. Then, when each packet arrives, both the short-term statistical table and the long-term statistical table are accessed. Considering the characteristics of computers, access to discontinuous and different memory areas increases a processing cost and therefore degrades the processing performance of the analysis function. For example, it takes a long time to access a main memory, which is 100 to 300 times longer than the time taken for the normal basic arithmetic operations. Therefore, providing both the function of storing statistical information at an infinitesimal time interval and the function of storing statistical information at a relatively long time interval imposes an excessive processing load on a computer.

SUMMARY

According to one aspect, there is provided a non-transitory computer-readable storage medium storing a computer program that causes a computer to perform a process including: updating, upon detecting each packet communicated via a network, statistical information indicating a communication state of the network for a first cycle, the statistical information being stored in a continuous storage area of a memory; reading the statistical information from the memory at every first cycle, and processing the statistical information and initializing the statistical information in the memory; and reading partial statistical information that is part of the statistical information from the memory at every second cycle, and processing the partial statistical information and initializing the partial statistical information in the memory, the second cycle being shorter than the first cycle.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
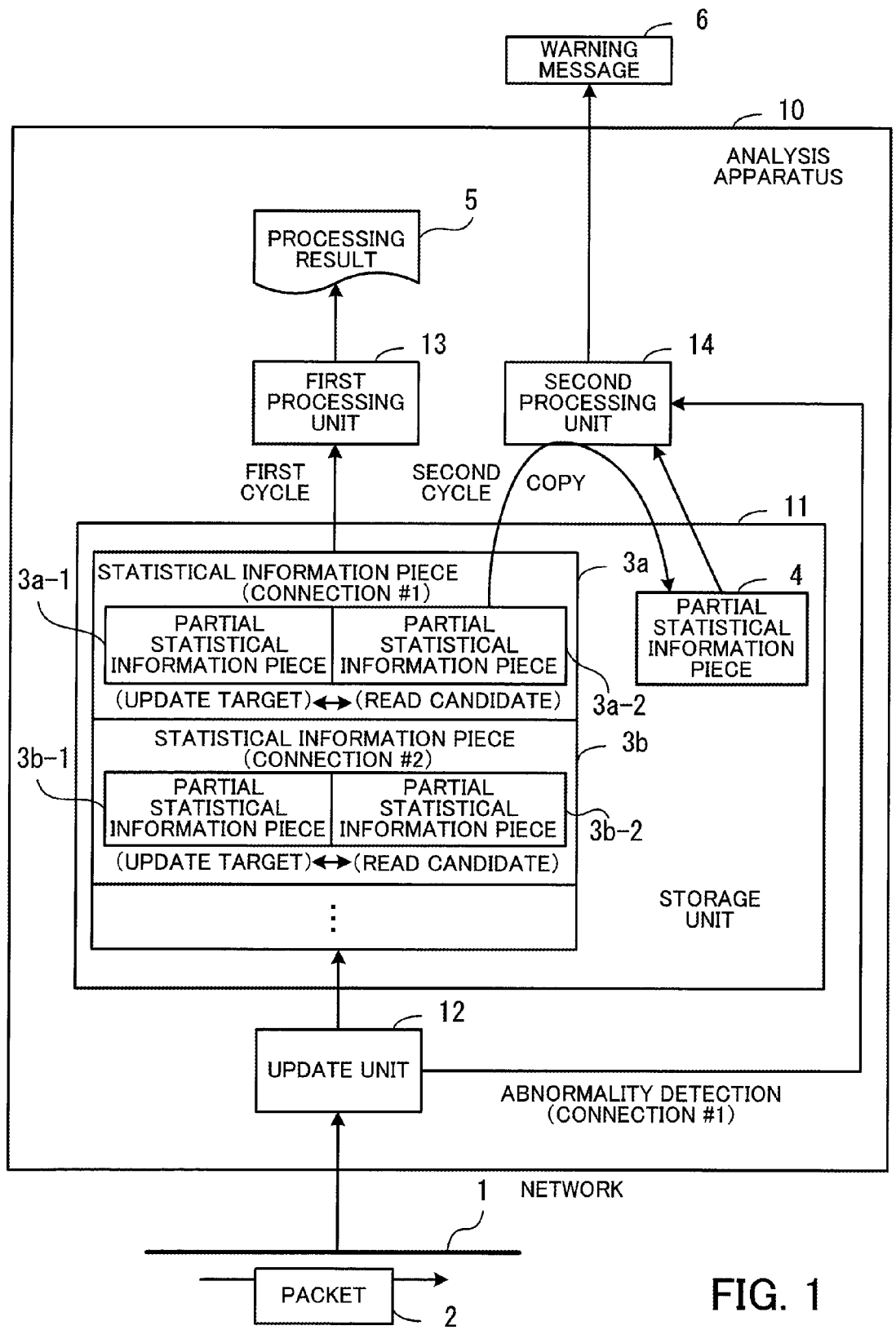
FIG. 1 illustrates an example of a functional configuration of an apparatus according to a first embodiment.

Several embodiments will be described below with reference to the accompanying drawings, wherein like reference numerals refer to like elements throughout. It is noted that one or more of the embodiments may be combined as long as the combined embodiments are not mutually exclusive.

First Embodiment

First, a first embodiment will be described. The first embodiment makes it possible to efficiently obtain statistical information on communication performed over a network, at a plurality of different cycles.

FIG. 1 illustrates an example of a functional configuration of an apparatus according to the first embodiment. An analysis apparatus 10 includes a storage unit 11, an update unit 12, a first processing unit 13, and a second processing unit 14.

The storage unit 11 stores statistical information pieces $3a$, $3b$, . . . each indicating the communication state of a network 1 for a first cycle. A statistical information piece $3a$, $3b$, . . . is generated for each connection established through the network 1. In addition, each statistical information piece $3a$, $3b$, . . . is stored in a continuous storage area.

Further, each statistical information piece $3a$, $3b$, . . . partly includes a partial statistical information piece $3a$-1, $3a$-2, $3b$-1, $3b$-2, . . . . Each partial statistical information piece $3a$-1, $3a$-2, $3b$-1, $3b$-2 . . . indicates a communication state for a second cycle shorter than the first cycle. For example, the first cycle is one minute long, and the second cycle is 10 milliseconds long. In this connection, each statistical information piece $3a$, $3b$, . . . may include a plurality of partial statistical information pieces $3a$-1, $3a$-2, $3b$-1, $3b$-2, . . . . For example, the partial statistical information pieces $3a$-1, $3a$-2, $3b$-1, $3b$-2, . . . for the current second cycle and the past most recent second cycle are included. In this case, the partial statistical information pieces $3a$-1, $3b$-1 . . . for the current second cycle are treated as update targets that are to be updated by the update unit 12, and the partial statistical information pieces $3a$-2, $3b$-2, . . . for the past most recent second cycle are treated as read candidates that are to be read by the second processing unit 14. When the current second cycle ends, the partial statistical information pieces $3a$-1, $3b$-1, . . . that have been the update targets become read candidates, and the partial statistical information pieces $3a$-2, $3b$-2, . . . that have been the read candidates become update targets.

When detecting each packet 2 communicated over the network 1, the update unit 12 updates the statistical information pieces $3a$, $3b$, . . . stored in the storage unit 11. In the case where the statistical information pieces $3a$, $3b$, . . . include a plurality of partial statistical information pieces $3a$-1, $3a$-2, $3b$-1, $3b$-2, . . . , the update unit 12 updates, for example, the partial statistical information pieces $3a$-1, $3b$-1, . . . corresponding to the current second cycle.

In addition, the update unit 12 may be designed to detect an abnormality in communication for each connection. For example, the update unit 12 compares a variable value indicated in the partial statistical information piece $3a$-1, $3b$-1, . . . for each connection, which is an update target, with a threshold to thereby detect whether an abnormality has occurred or not. In the case where the amount of data transfer in communication on a connection is used as such a variable value, the update unit 12 determines that an abnormality has occurred in the connection when the variable value is equal to or greater than a threshold. When detecting an abnormality, the update unit 12 notifies the second processing unit 14 of the connection in which the abnormality has occurred.

The first processing unit 13 reads the statistical information pieces $3a$, $3b$, . . . from the storage unit 11 at every first cycle, and processes the statistical information pieces $3a$, $3b$, . . . and initializes the statistical information pieces $3a$, $3b$, . . . in the storage unit 11. For example, the first processing unit 13 compiles the statistical information pieces $3a$, $3b$, . . . and performs a statistical process. The first processing unit 13 outputs a processing result 5, for example, as a single file.

The second processing unit 14 reads the partial statistical information pieces $3a$-2, $3b$-2, . . . from the storage unit 11 at every second cycle shorter than the first cycle, and processes the partial statistical information pieces $3a$-2, $3b$-2, . . . . The second processing unit 14 also initializes the read partial statistical information pieces $3a$-2, $3b$-2, . . . in the storage unit 11. For example, when each second cycle ends, the second processing unit 14 reads only the partial statistical information pieces on connections in which an abnormality was detected in that cycle. In the case where the statistical information piece $3a$ on a connection in which an abnormality was detected includes a plurality of partial statistical information pieces $3a$-1 and $3a$-2, the second processing unit 14 reads the past most recent partial statistical information piece $3a$-2. For example, the second processing unit 14 copies the read partial statistical information piece $3a$-2 to another storage area of the storage unit 11. Then, for example, the second processing unit 14 compiles information and performs a statistical process, using the copy 4 of the partial statistical information piece. If the second processing unit 14 detects a failure in communication performed over the network 1, as a result of processing the partial statistical information piece, the second processing unit 14 outputs a warning message 6, for example. In this connection, even in the case where the second processing unit 14 reads only the partial statistical information pieces on connections in which an abnormality was detected, the second processing unit 14 initializes the partial statistical information pieces 3a-2, 3b-2, . . . that are the read candidates in all the statistical information pieces 3a, 3b, . . . after the reading. Then, the partial statistical information pieces 3a-1, 3a-2, 3b-1, and 3b-2, . . . switch between update targets and read candidates.

As described above, in the analysis apparatus 10, the update unit 12 updates the statistical information pieces 3a, 3b, . . . on the basis of packets 2 communicated over the network 1. At this time, the partial statistical information pieces 3a-1, 3b-1, . . . that are update targets are updated simultaneously. If a predetermined variable value indicated in an updated partial statistical information piece 3a-1, 3b-1, . . . exceeds a threshold, the update unit 12 determines that an abnormality has occurred. When detecting the abnormality, the update unit 12 notifies the second processing unit 14 of the identifier of the connection in which the abnormality has occurred. In the following explanation, it is assumed that an abnormality is detected in a "connection #1".

The statistical information pieces 3a, 3b, . . . are read by the first processing unit 13 and the second processing unit 14. For example, the statistical information pieces 3a, 3b, . . . are read by the first processing unit 13 at every first cycle of about one minute, and are then subjected to a statistical process. The processing result 5 is then output. In addition, for example, the partial statistical information piece 3a-2 on the connection in which the abnormality was detected, which is a read candidate in the statistical information piece 3a, is read by the second processing unit 14 at the second cycle of about 10 milliseconds. The read partial statistical information piece 3a-2 is copied to another storage area of the storage unit 11, and the copy 4 of the partial statistical information piece is then subjected to a statistical process by the second processing unit 14. If a failure is detected in the network 1 as a result of the statistical process, the second processing unit 14 outputs the warning message 6.

By doing so, it is possible to efficiently perform the statistical process at different cycles, i.e., the first cycle and the second cycle. That is, what needs to be updated when a packet 2 is obtained is one statistical information piece stored in a continuous storage area. Even in the statistical process that is performed at a plurality of different cycles, there is no need of performing an update process a plurality of times to update a plurality of statistical information pieces stored in separate storage areas. This streamlines the processing. Therefore, it is possible to set a very short cycle as the second cycle. For example, in the case of detecting bursty traffic as an abnormality in the network, an abrupt increase in the amount of data transfer is detected immediately.

Further, for the partial statistical information pieces 3a-1, 3a-2, 3b-1, 3b-2, . . . that are used by the second processing unit 14, there needs only a storage area for storing the partial statistical information pieces 3a-1, 3a-2, 3b-1, 3b-2, . . . for several second cycles. This reduces memory usage. There is an idea of storing the partial statistical information pieces 3a-1, 3a-2, 3b-1, 3b-2, . . . for the second cycles equal in time to the first cycle, and when the first cycle ends, performs the statistical process on these information pieces collectively. However, this idea needs a large amount of memory. For example, in the case where the first cycle is one minute long and the second cycle is 10 milliseconds long, 6000 partial statistical information pieces 3a-1, 3a-2, 3b-1, 3b-2, . . . , one of which is generated for each second cycle, are stored. In the case where the statistical information pieces are stored for each connection, more memory is needed. In a large-scale system, there may be a time when 100 thousand connections are established simultaneously. In this case, an enormous amount of memory is needed, and it may not be possible to monitor the network with a single computer. To deal with this, in the case where only the partial statistical information pieces 3a-1, 3a-2, 3b-1, 3b-2, . . . for several second cycles need to be stored, as illustrated in FIG. 1, it is possible to monitor the network with a single computer.

Still further, the second processing unit 14 reads only the partial statistical information piece 3a-2 on the connection in which an abnormality was detected, so that the number of information pieces to be subjected to the statistical process and the number of connections whose information pieces need to be stored are reduced, thereby reducing the memory usage and the amount of processing. For example, in order to detect bursty traffic, the second processing unit 14 needs to detect only traffic patterns that cause degradation in the network quality, and does not need to process statistical information pieces on instantaneous traffic in all connections. Therefore, it is possible to perform sufficient and useful network monitoring by reading and processing only the partial statistical information piece 3a-2 on the connection in which an abnormality was detected.

Still further, the second processing unit 14 reads the partial statistical information pieces 3a-1, 3a-2, 3b-1, 3b-2, . . . at a very short cycle. Therefore, there is a high possibility that the read of the partial statistical information pieces by the second processing unit 14 and the update of statistical information pieces by the update unit 12 are done at the same time. After reading the partial statistical information piece 3a-2, the second processing unit 14 initializes the partial statistical information pieces 3a-2, 3b-2, . . . that are read candidates. If the reading and the updating are done at the same time, data consistency may not be ensured. Exclusive control to prevent data inconsistency increases a processing load. To deal with this, in the analysis apparatus 10 of the first embodiment, a plurality of storage areas is prepared for storing the partial statistical information pieces 3a-1, 3a-2, 3b-1, 3b-2, . . . , that are obtained at every second cycle, in the statistical information pieces 3a, 3b, . . . , and the partial statistical information pieces 3a-1, 3a-2, 3b-1, 3b-2, . . . switch between update targets and read candidates at every second cycle. This prevents the read of a partial statistical information piece by the second processing unit 14 and the update of the partial statistical information piece by the update unit 12 from occurring at the same time, so as to ensure data consistency.

In this connection, the update unit 12, the first processing unit 13, and the second processing unit 14 may be implemented by using a processor provided in the analysis apparatus 10, for example. The storage unit 11 may be implemented by using a memory provided in the analysis apparatus 10, for example.

In addition, the lines connecting between elements illustrated in FIG. 1 represent part of communication paths, and communication paths other than the illustrated paths may be configured.

Second Embodiment

The following describes a second embodiment. The second embodiment describes the case of collecting statistical information for each connection in communication between a number of nodes.

Figure 2:
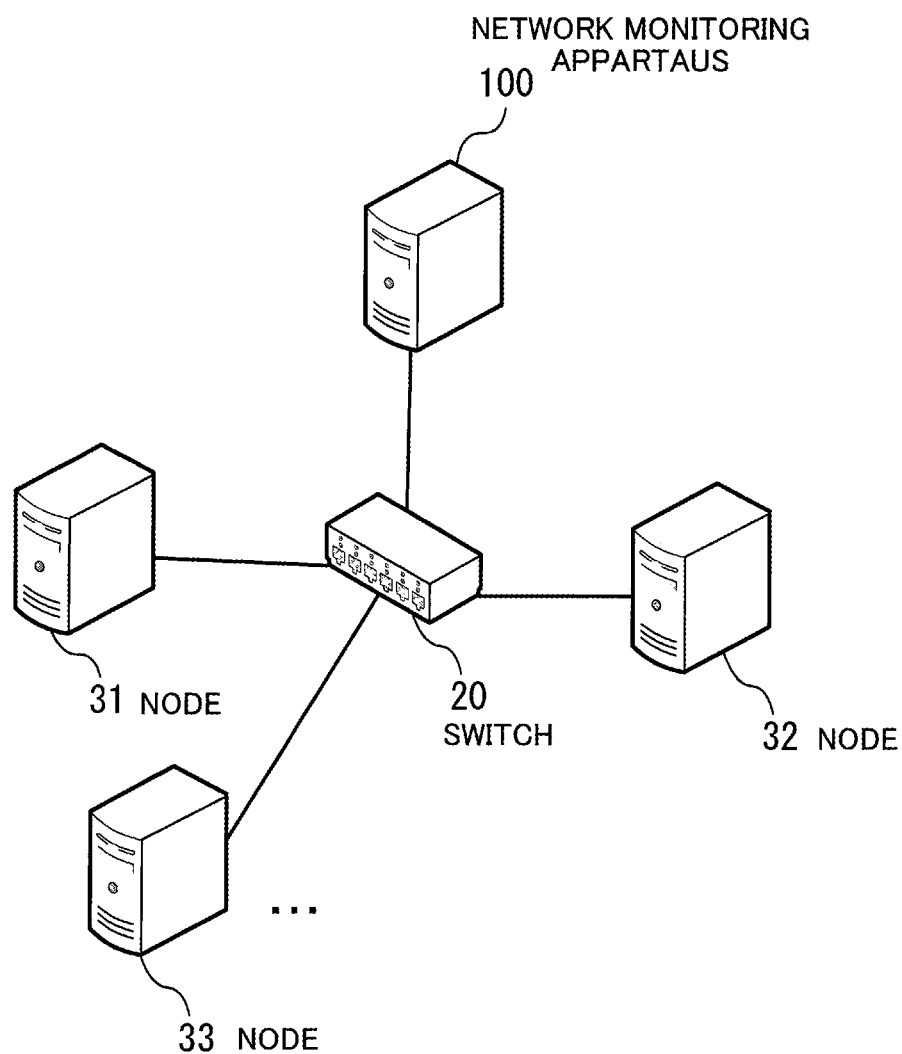
FIG. 2 illustrates an example of a system configuration according to a second embodiment.

FIG. 2 illustrates an example of a system configuration according to the second embodiment. A plurality of nodes 31, 32, 33, . . . are connected to each other via a switch 20. The switch 20 has a port mirroring function. Port mirroring is a function of sending a copy of data communicated on a port, from another port (a mirror port). A network monitoring apparatus 100 is connected to the mirror port of the switch 20. The network monitoring apparatus 100 is implemented by using, for example, a computer.

The network monitoring apparatus 100 receives data output from the mirror port and monitors the communication state of a network. The network monitoring apparatus 100 performs both compiling (basic statistical process) of statistical information at an interval longer than one minute and compiling (burst statistical process) of statistical information at an interval of milliseconds.

Figure 3:
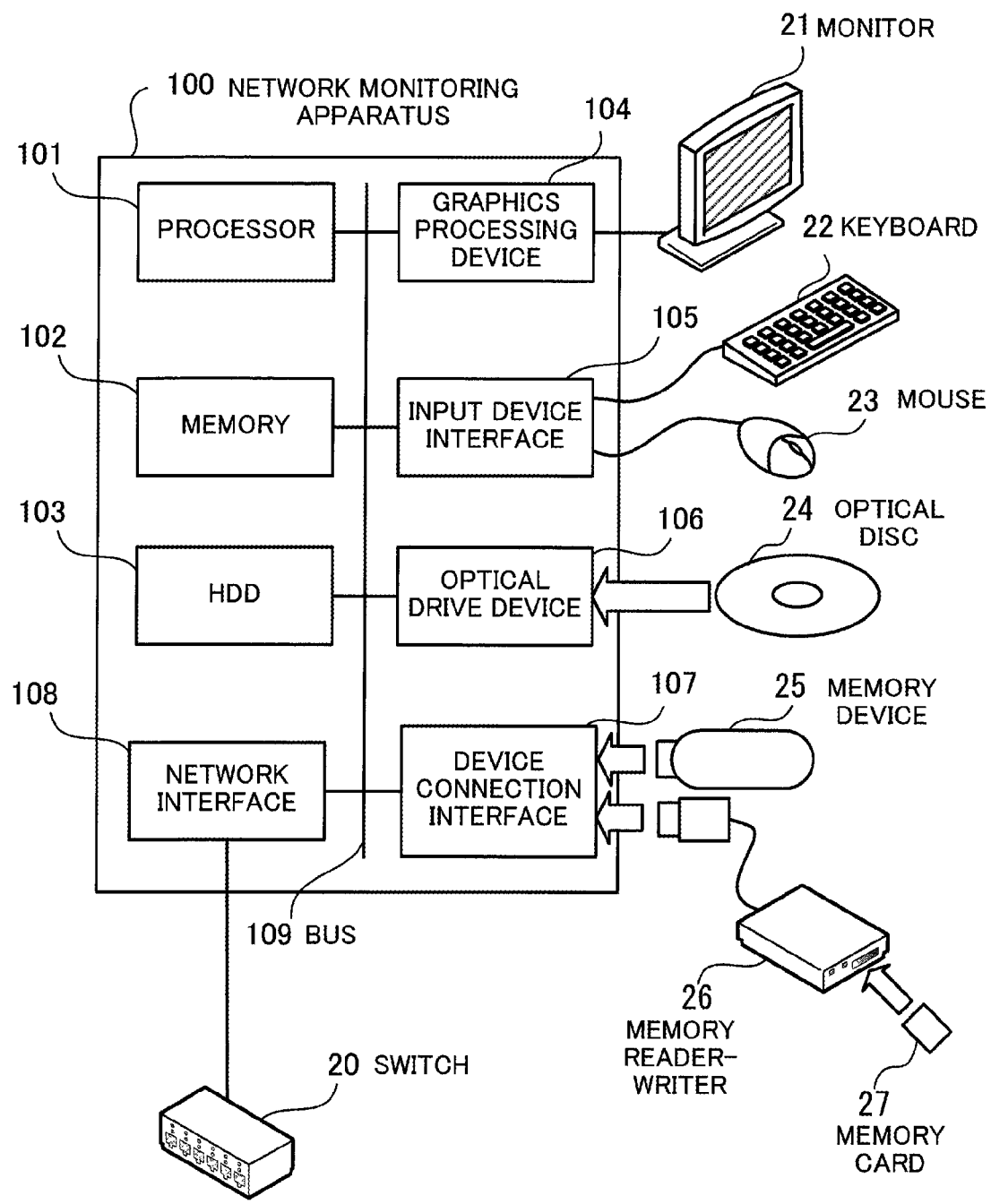
FIG. 3 illustrates an example of a hardware configuration of a network monitoring apparatus used in the second embodiment.

FIG. 3 illustrates an example of a hardware configuration of a network monitoring apparatus used in the second embodiment. The network monitoring apparatus 100 is entirely controlled by a processor 101. To the processor 101, a memory 102 and a plurality of peripheral devices are connected via a bus 109. The processor 101 may be a multiprocessor. The processor 101 may be, for example, a Central Processing Unit (CPU), a Micro Processing Unit (MPU), or a Digital Signal Processor (DSP). Some or all of the functions of the processor 101 may be implemented by using an Application Specific Integrated Circuit (ASIC), Programmable Logic Device (PLD), or other electronic circuits.

The memory 102 is used as a primary storage device of the network monitoring apparatus 100. The memory 102 temporarily stores at last part of Operating System (OS) programs and application programs to be executed by the processor 101. The memory 102 also stores various types of data to be used in processing performed by the processor 101. As the memory 102, for example, a volatile semiconductor memory device, such as a Random Access Memory (RAM), may be used.

The peripheral devices connected to the bus 109 include a Hard Disk Drive (HDD) 103, a graphics processing device 104, an input device interface 105, an optical drive device 106, a device connection interface 107, and a network interface 108.

The HDD 103 magnetically writes and reads data on a built-in disk. The HDD 103 is used as a secondary storage device of the network monitoring apparatus 100. The HDD 103 stores the OS programs, application programs, and various types of data. As the secondary storage device, a non-volatile semiconductor storage device, such as a flash memory, may be used.

To the graphics processing device 104, a monitor 21 is connected. The graphics processing device 104 displays images on the screen of the monitor 21 in accordance with instructions from the processor 101. As the monitor 21, a display device using Cathode Ray Tube (CRT), a liquid crystal display device, or the like may be used.

To the input device interface 105, a keyboard and a mouse 23 are connected. The input device interface 105 gives the processor 101 signals received from the keyboard 22 and mouse 23. The mouse 23 is one example of pointing devices, and another pointing device may be used. Other pointing devices include, for example, a touch panel, a tablet, a touchpad, a track ball, and so on.

The optical drive device 106 reads data from an optical disc 24 using laser light or the like. The optical disc 24 is a portable recording medium on which data is recorded so as to be read with reflection of light. As the optical disc 24, a Digital Versatile Disc (DVD), DVD-RAM, Compact Disc Read Only Memory (CD-ROM), CD-R (Readable), CD-RW (ReWritable), etc. may be used.

The device connection interface 107 is a communication interface for allowing peripheral devices to be connected to the network monitoring apparatus 100. For example, a memory device 25 and a memory reader-writer 26 may be connected to the device connection interface 107. The memory device 25 is a recording medium provided with a function for performing communications with the device connection interface 107. The memory reader-writer 26 is a device that writes and reads data on a memory card 27. The memory card 27 is a card-type recording medium.

The network interface 108 is connected to the switch 20. The network interface 108 communicates data with other network monitoring apparatuses or communication devices via the switch 20.

With the above hardware configuration, the processing functions of the second embodiment may be realized. In this connection, each of the nodes 31, 32, 33, . . . that perform communications may be configured with the same hardware as the network monitoring apparatus 100. Further, the analysis apparatus 10 of the first embodiment may also be configured with the same hardware as the network monitoring apparatus 100 illustrated in FIG. 3.

The network monitoring apparatus 100 realizes the processing functions of the second embodiment by executing programs stored in a recording medium that the network monitoring apparatus is able to read. The program describing the contents of processing to be executed by the network monitoring apparatus 100 may be recorded on various types of recording media. For example, the programs to be executed by the network monitoring apparatus 100 may be stored on the HDD 103. The processor 101 loads at least part of the programs from the HDD 103 to the memory 102 and then executes the programs. Alternatively, the programs to be executed by the network monitoring apparatus 100 may be recorded on a portable recording medium, such as the optical disc 24, the memory device 25, the memory card 27, etc. By being installed on the HDD 103 under the control of the processor 101, for example, the programs recorded on the portable recording medium become executable. Alternatively, the processor 101 executes the programs while reading the programs directly from the portable recording medium.

Figure 4:
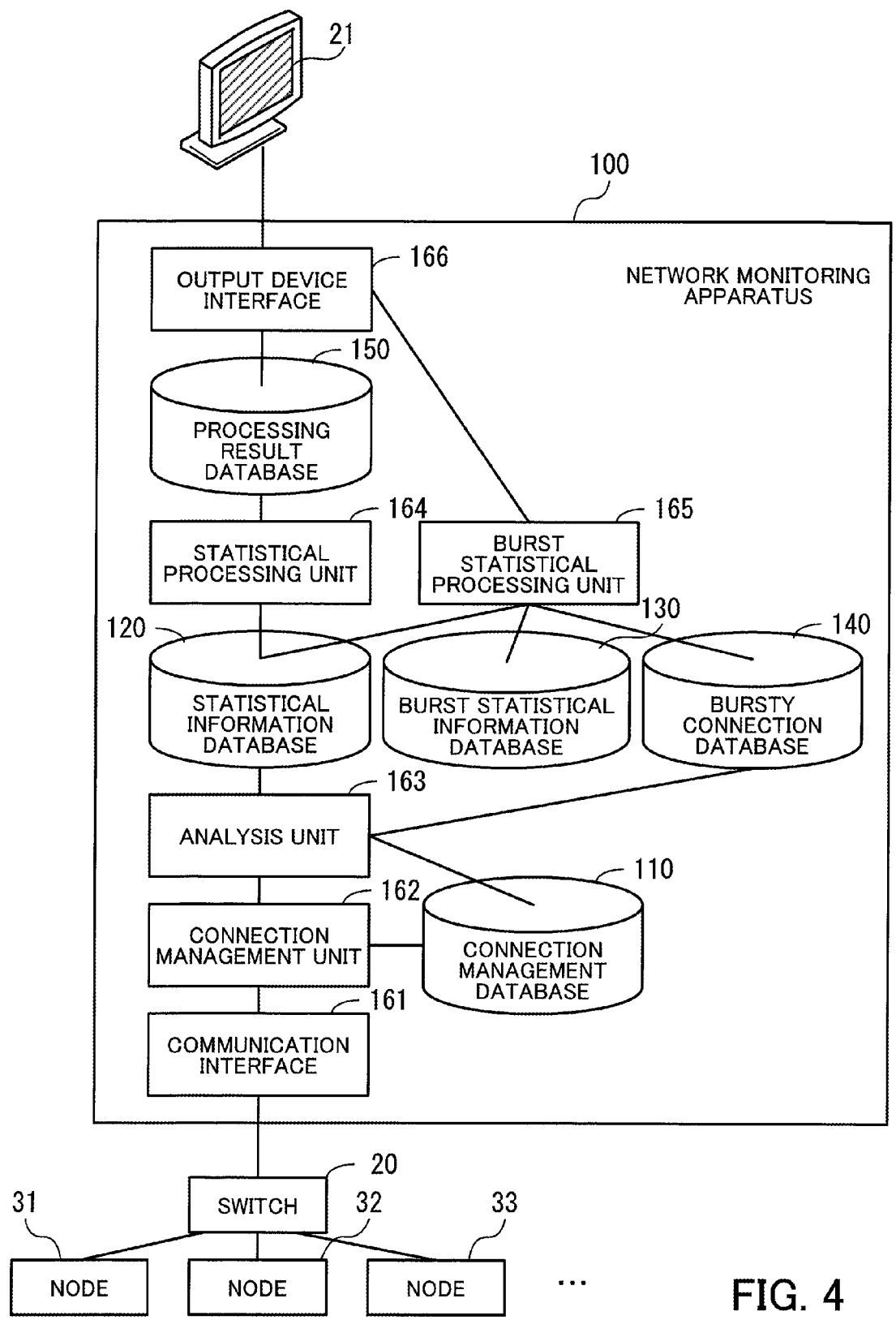
FIG. 4 is a block diagram illustrating an example of functions of the network monitoring apparatus.

FIG. 4 is a block diagram illustrating an example of functions of a network monitoring apparatus. To store information, the network monitoring apparatus 100 includes a connection management database 110, a statistical information database 120, a burst statistical information database 130, a bursty connection database 140, and a processing result database 150. Out of these databases, the connection management database 110, statistical information database 120, burst statistical information database 130, and bursty connection database 140 are stored in the memory 102. The processing result database 150 is stored in the HDD 103.

The connection management database 110 contains information indicating connections whose communication was detected. The statistical information database 120 contains statistical information obtained by analyzing packets for respective connections. The burst statistical information database 130 contains statistical information to be used for burst statistics. The bursty connection database 140 contains information on connections in which bursty traffic was detected. The processing result database 150 contains compiled information obtained through a basic statistical process. The connection management database 110, statistical information database 120, burst statistical information database 130, and bursty connection database 140 will be described in detail later (refer to FIGS. 5 to 7). The processing result database 150 contains information on the state of traffic detected based on statistical information compiled, for example, at an interval longer than one minute. If there is a time period during which the amount of traffic generated in a statistical cycle is excessive, for example, the time period, information on connections that sent the large amount of traffic, and so on are registered in the processing result database 150.

A communication interface 161 obtains packets seen at the mirror port of the switch 20. Thereby, the packets communicated via the switch 20 are captured by the network monitoring apparatus 100. The communication interface 161 gives the obtained packets to a connection management unit 162.

The connection management unit 162 identifies connections on the basis of the obtained packets, gives a connection ID to each of the connections, and stores information on the connections in the connection management database 110. In addition, when receiving a packet, the connection management unit 162 gives the packet to an analysis unit 163 together with the identifier of a connection that sent the packet.

When each packet is received, the analysis unit 163 stores statistical information, which is generated for each connection, on the basis of the connection ID notified of from the connection management unit 162, in the statistical information database 120. In addition, the analysis unit 163 determines whether a sudden abnormality has occurred or not, on the basis of the stored statistical information. When detecting a sudden abnormality, the analysis unit 163 registers the connection ID of the connection in which the abnormality has occurred, in the bursty connection database 140.

A statistical processing unit 164 periodically refers to the statistical information database 120, compiles the statistical information for a predetermined time period, and performs a statistical process. Then, the statistical processing unit 164 stores the result of the statistical process in the processing result database 150. When completing the statistical process, the statistical processing unit 164 initializes the statistical information contained in the statistical information database 120, so as to allow statistical information for the next cycle to be stored. Hereinafter, a cycle at which the statistical processing unit 164 compiles statistical information is called a basic statistical cycle. The basic statistical cycle is, for example, one minute long.

A burst statistical processing unit 165 refers to the statistical information database 120 at every predetermined cycle (burst statistical cycle), compiles statistical information (burst statistical information) used for a bursty traffic statistical process out of the statistical information, and performs the statistical process. For example, the burst statistical processing unit 165 detects connections in which bursty traffic was detected, with reference to the bursty connection database 140. Then, the burst statistical processing unit 165 copies, from the statistical information database 120 to the burst statistical information database 130, burst statistical information on the connections in which the bursty traffic was detected in the past most recent burst analysis cycle, which already ended. After the copy of all of the burst statistical information is completed, the burst statistical processing unit 165 initializes the burst statistical information of the past most recent burst statistical cycle in the statistical information database 120, so as to allow burst statistical information for the next burst statistical cycle to be stored. Then, the burst statistical processing unit 165 compiles the burst statistical information using the copy thereof stored in the burst statistical information database 130 and processes the information statistically. In the case where a serious problem is detected as a result of processing the burst statistical information statistically, the burst statistical processing unit 165 outputs a warning message (alert). In this connection, the burst statistical cycle is shorter than the basic statistical cycle used by the statistical processing unit 164. For example, the burst statistical processing unit 165 compiles the statistical information at every 10 milliseconds.

An output device interface 166 displays the contents of the processing result database 150 and an alert output from the burst statistical processing unit 165 on the monitor 21.

In this connection, the lines connecting between elements illustrated in FIG. 4 represent part of communication paths, and communication paths other than the illustrated paths may be configured. In addition, the functions of each element illustrated in FIG. 4 may be implemented by, for example, a computer executing a program module corresponding to the functions. The elements illustrated in FIG. 4 are an example of means for implementing the elements of the analysis apparatus 10 of FIG. 1. For example, the functions including the connection management database 110, connection management unit 162, and analysis unit 163 are an example of the update unit 12 of FIG. 1. The statistical information database 120, burst statistical information database 130, and bursty connection database 140 are an example of the storage unit 11 of FIG. 1. The statistical processing unit 164 is an example of the first processing unit 13 of FIG. 1. The burst statistical processing unit 165 is an example of the second processing unit 14 of FIG. 1.

With the network monitoring apparatus 100 having the above functions, the state of a network is monitored. The following describes the data structures of the databases with reference to FIGS. 5 to 7.

Figure 5:
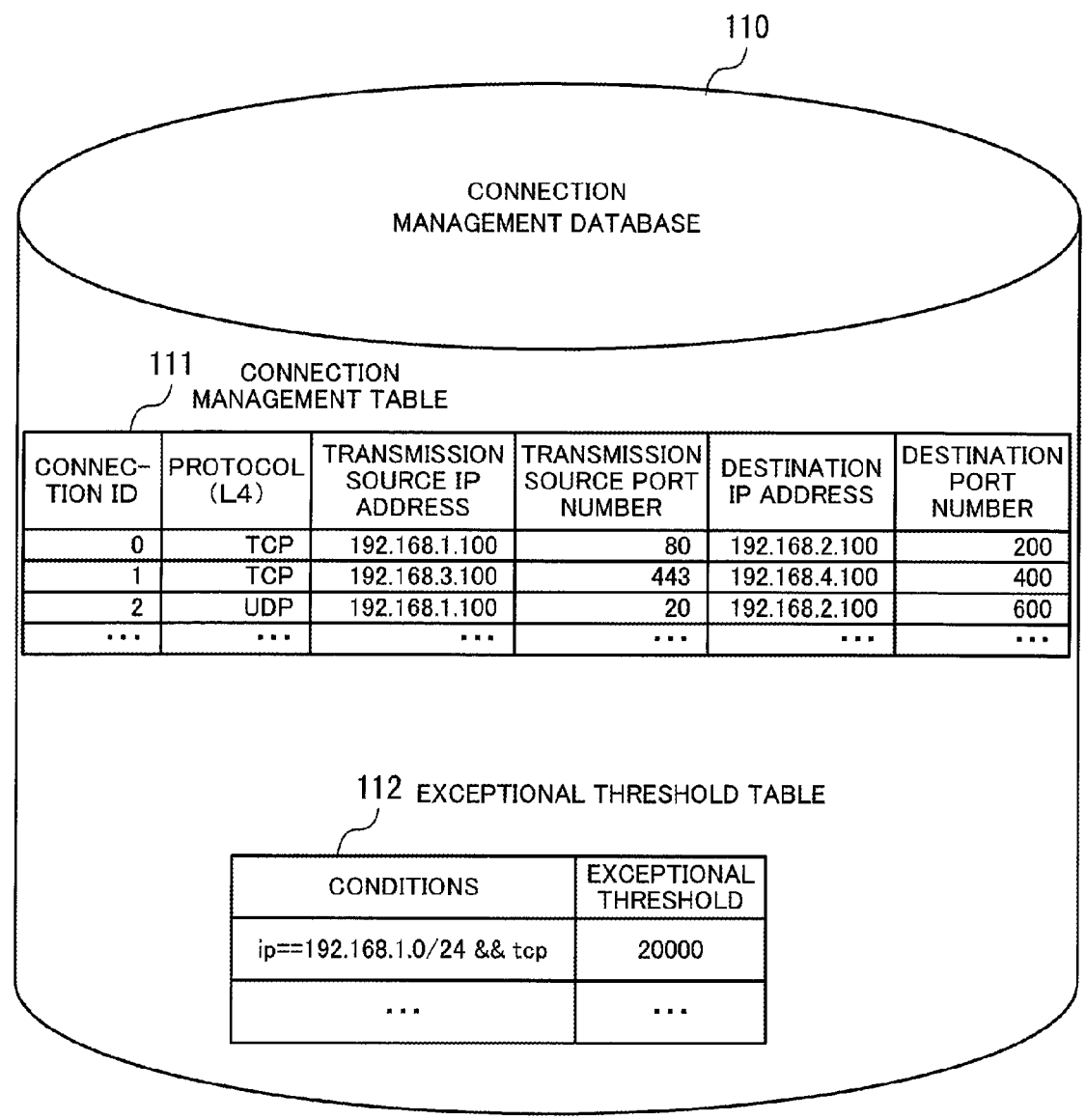
FIG. 5 illustrates an example of a data structure of a connection management database.

FIG. 5 illustrates an example of a data structure of a connection management database. The connection management database 110 contains a connection management table 111 and an exceptional threshold table 112. The connection management table 111 is a data table that contains information on recognized connections. The exceptional threshold table 112 is a data table that defines exceptions regarding thresholds for detecting bursty traffic.

The connection management table 111 includes the following fields: connection ID, protocol, transmission source IP address, transmission source port number, destination IP address, and destination port number. The connection ID field contains the identifier (connection ID) of a connection. The protocol field indicates a transport layer (fourth layer) protocol in the OSI reference model, over which packets were communicated via a corresponding connection. The transport layer protocols include, for example, Transmission Control Protocol (TCP) and User Datagram Protocol (UDP), for example. The transmission source IP address field contains the IP address of a node that is the transmission source of packets communicated through the corresponding connection. The transmission source port number field contains the IP port number of the transmission source of the packets communicated through the corresponding connection. The destination IP address field contains the IP address of the destination of the packets communicated through the corresponding connection. The destination port number field contains the IP port number of the destination of the packets communicated through the corresponding connection.

The exceptional threshold table 112 includes the following fields: conditions and exceptional threshold. The conditions field indicates conditions for applying an exceptional threshold for detecting bursty traffic. For example, the conditions field specifies an IP address and a protocol so that an exceptional threshold is applied to connections established from the node with the specified IP address using the specified protocol. The exceptional threshold field contains a threshold to be applied to connections satisfying the conditions.

Figure 6:
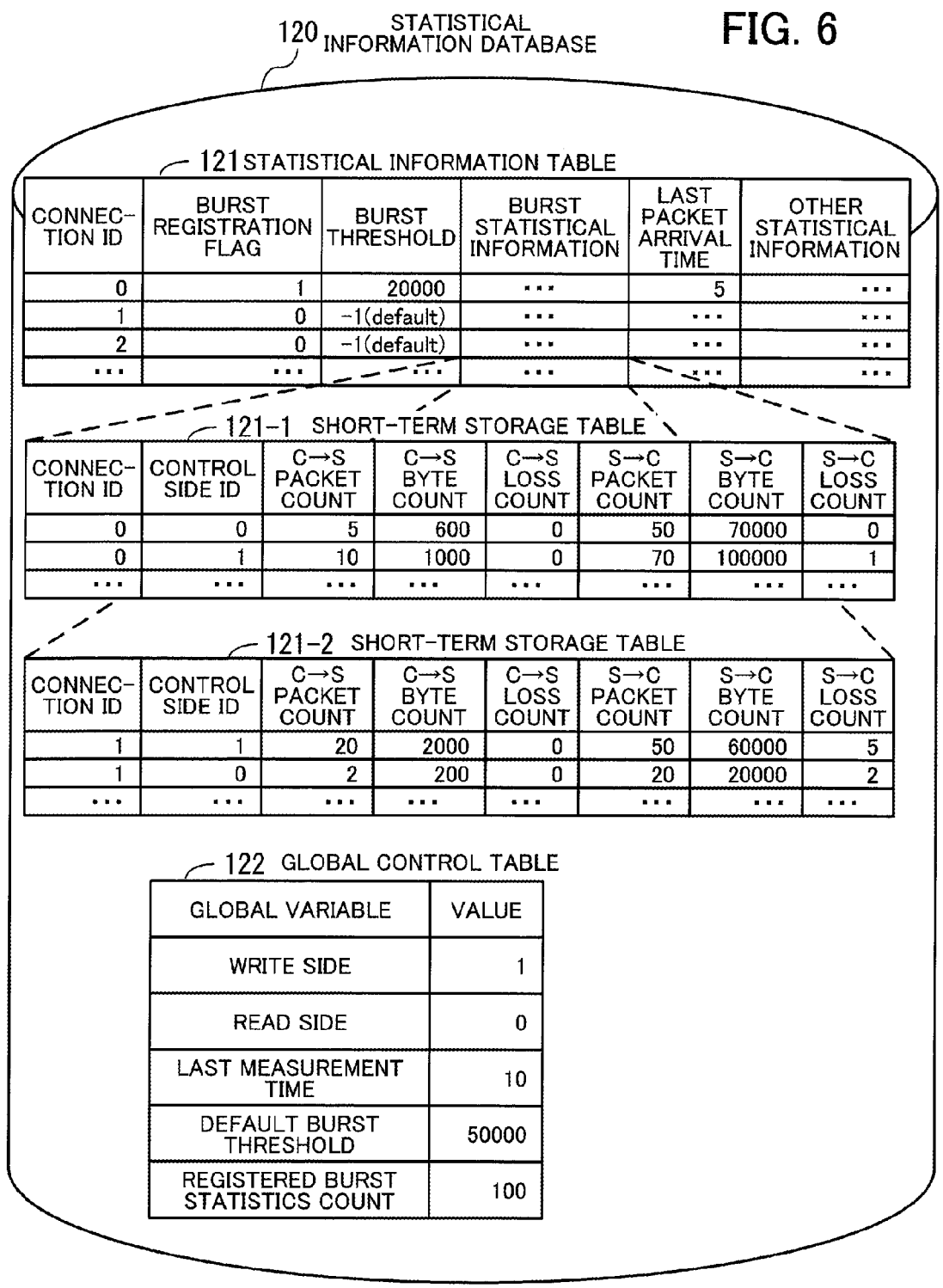
FIG. 6 illustrates an example of a data structure of a statistical information database.

FIG. 6 illustrates an example of a data structure of a statistical information database. The statistical information database 120 contains a statistical information table 121 and a global control table 122. The statistical information table 121 is a data table that collectively contains statistical information to be used for bursty traffic detection and statistical information to be used for detecting failures other than bursty traffic. The global control table 122 is a data table that contains global variables to be used for managing burst statistical information.

The statistical information table 121 includes the following fields: connection ID, burst registration flag, burst threshold, burst statistical information, last packet arrival time, and other statistical information. Each record in the statistical information table 121 is stored in a continuous storage area of the memory 102.

The connection ID field contains the connection ID of a connection used for communicating packets.

The burst registration flag field includes a flag (burst registration flag) indicating whether bursty traffic was detected in a corresponding connection or not. For example, a burst registration flag of "1" indicates that bursty traffic was detected, and a burst registration flag of "0" indicates that bursty traffic was not detected.

The burst threshold field contains a threshold (burst threshold) to be used for detecting bursty traffic, which is applied to the corresponding connection. For example, with respect to connections satisfying the conditions indicated in the exceptional threshold table 112 of FIG. 5, an exceptional threshold corresponding to the satisfied conditions is set as the burst threshold. With respect to connections that do not satisfy any conditions indicated in the exceptional threshold table 112, on the other hand, a value (for example, "−1") indicating that a default burst threshold is to be applied is set in the burst threshold field.

The burst statistical information field contains burst statistical information to be used for detecting bursty traffic. For example, the burst statistical information is stored in short-term storage tables 121-1 and 121-2 that are created for respective connections. The storage area in each short-term storage table 121-1 and 121-2 is divided into a plurality of control sides. Burst statistical information for each burst statistical cycle is stored in one of the storage areas for the respective control sides in turn.

Each short-term storage table 121-1 and 121-2 includes the following fields: connection ID, control side ID, C→S packet count, C→S byte count, C→S loss count, S→C packet count, S→C byte count, and S→C loss count. The connection ID field contains the connection ID of a connection that performed communication. The control side ID field contains the identification information (control side ID) of a control side. The C→S packet count field indicates the number of packets from a client to a server. For example, packets including a request message are determined as packets from a client to a server. The C→S byte count field indicates the amount of data (the number of bytes) transmitted from the client to the server. The C→S loss count field indicates the number of lost packets in the packets from the client to the server. The S→C packet count field indicates the number of packets from the server to the client. For example, packets including a response message to a request are determined as packets from a server to a client. The S→C byte count field indicates the amount of data (the number of bytes) transmitted from the server to the client. The S→C loss count field indicates the number of lost packets in the packets from the server to the client.

In this connection, as the burst statistical information, estimated values of other network quality, such as delay time, band information, etc., may be added, for example.

The last packet arrival time field indicates a time when a packet communicated last through the corresponding connection was received by the network monitoring apparatus 100.

The other statistical information field contains various kinds of statistical information to be compiled at a basic statistical cycle, other than burst statistical information.

The global control table 122 includes the following fields: global variable and value. The global variable field contains the name of a global variable. The value field contains the value of the global variable. As global variables, a write side, a read side, a last measurement time, a default burst threshold, and a registered burst statistics count are set. The value of the write side indicates the number of a control side serving as a write destination for writing burst statistical information by the analysis unit 163. The value of the read side indicates the number of a control side serving as a copy source for copying burst statistical information by the burst statistical processing unit 165. The value of the last measurement time indicates a last update completion time of burst statistical information. The value of the default burst threshold is a burst threshold set in default. The value of the registered burst statistics count is the number of connections in which bursty traffic was detected to have occurred.

As illustrated in FIG. 6, in the statistical information database 120, the short-term storage tables 121-1, 121-2, . . . that store burst statistical information for a short time are included in the statistical information table 121 that stores statistical information for a long time. Out of them, the short-term storage tables 121-1, 121-2, . . . are copy targets that are to be copied to the burst statistical information database 130. In addition, the statistical information on at least the same connection in the same control side is stored in a continuous storage area of the memory 102. By doing so, the update of the statistical information (memory access at the arrival of each packet) may be done by accessing a single record in the statistical information table 121, without the need of accessing a plurality of areas, thereby streamlining the processing. Further, at every burst statistical cycle, the most recently used control side, where the update is complete, in the short-term storage tables 121-1, 122-2, . . . is referenced and the statistical information in that control side is copied to the burst statistical information database 130, thereby reducing the number of accesses to the burst statistical information database 130.

Figure 7:
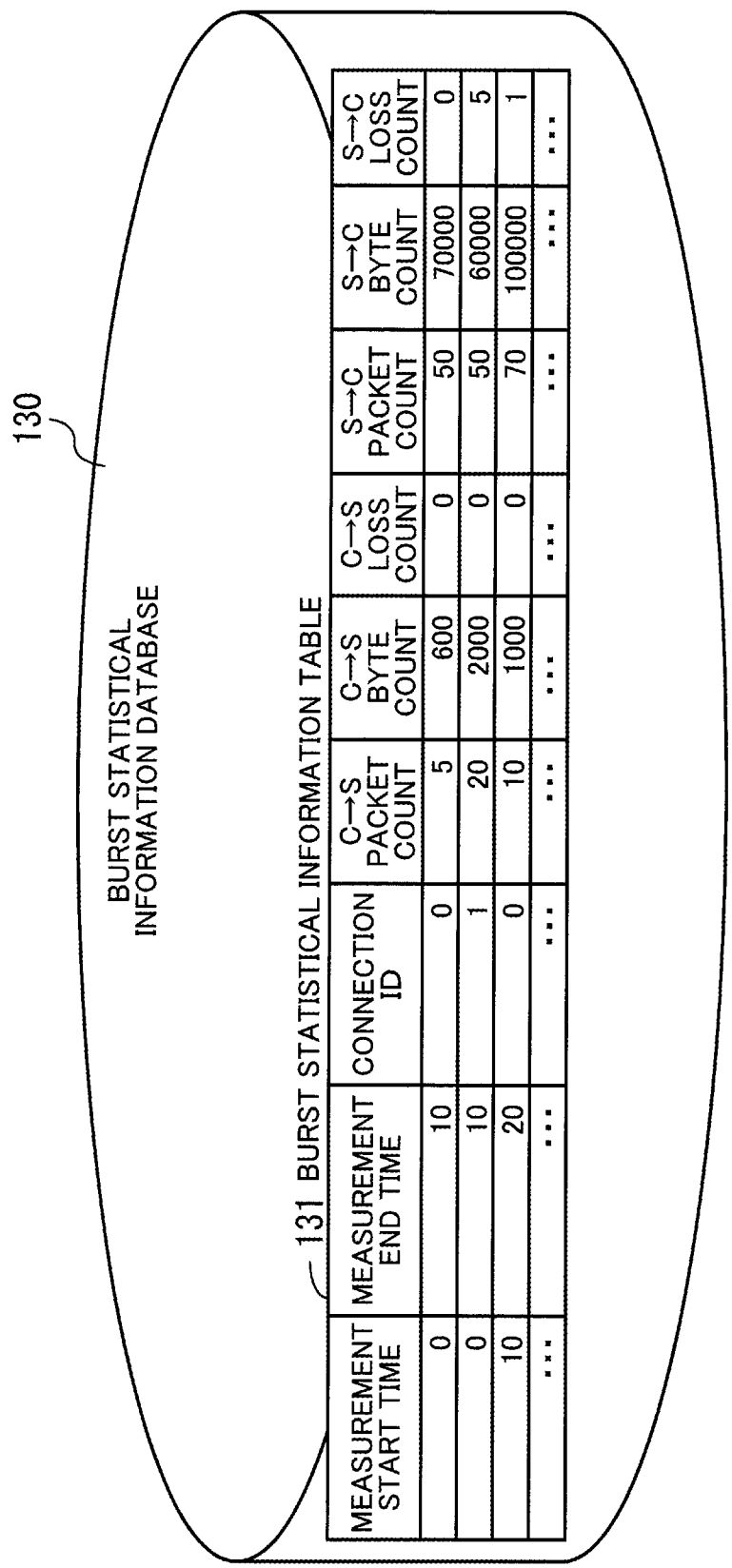
FIG. 7 illustrates an example of a data structure of a burst statistical information database.

FIG. 7 illustrates an example of a data structure of a burst statistical information database. The burst statistical information database 130 contains a burst statistical information table 131 that contains burst statistical information on connections in which bursty traffic was detected. The burst statistical information table 131 contains, in addition to a copy of the burst statistical information of the statistical information table 121 (refer to FIG. 6), a measurement start time and a measurement end time for each piece of the burst statistical information. The measurement start time indicates a time when the measurement of the information indicated by the burst statistical information started. The measurement end time indicates a time when the measurement of the information indicated by the burst statistical information ended.

Figure 8:
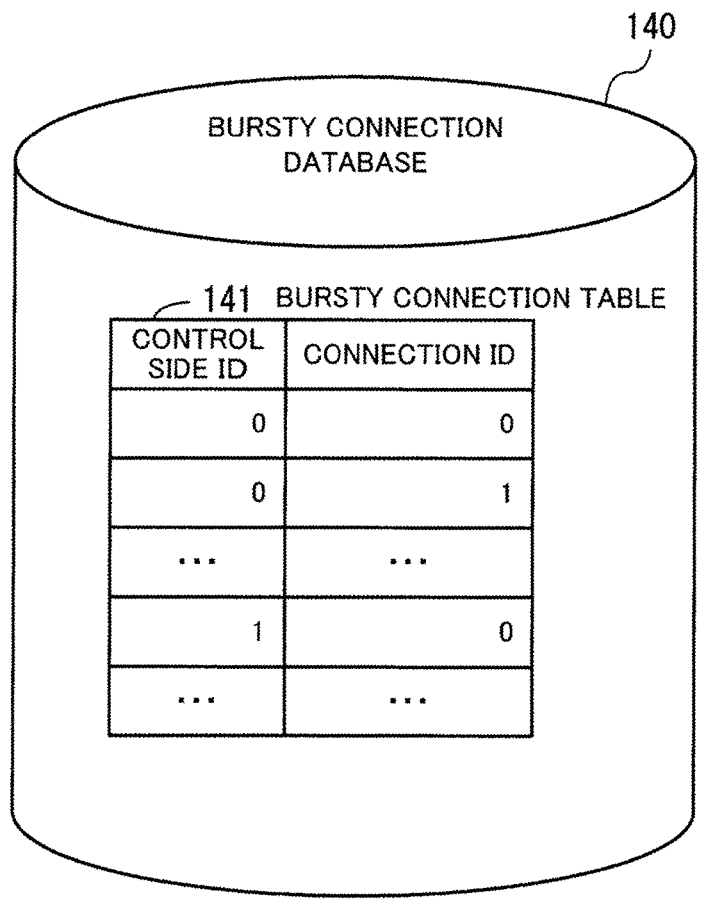
FIG. 8 illustrates an example of a data structure of a bursty connection database.

FIG. 8 illustrates an example of a data structure of a bursty connection database. The bursty connection database 140 contains a bursty connection table 141, which includes the following fields: control side ID and connection ID. The control side ID field indicates the identification number of a control side in which burst statistical information on a connection in which bursty traffic was detected is stored. The connection ID field indicates the identifier (connection ID) of a connection in which the bursty traffic was detected.

Using the above-described databases, network monitoring is performed using a statistical process. The network monitoring is divided into an analysis process and a statistical process. The analysis process is a process from capturing of a packet to storing of statistical information. The statistical process is a process from compiling of statistical information to execution of statistics. The following describes in detail how to perform the analysis process and the statistical process.

Figure 9:
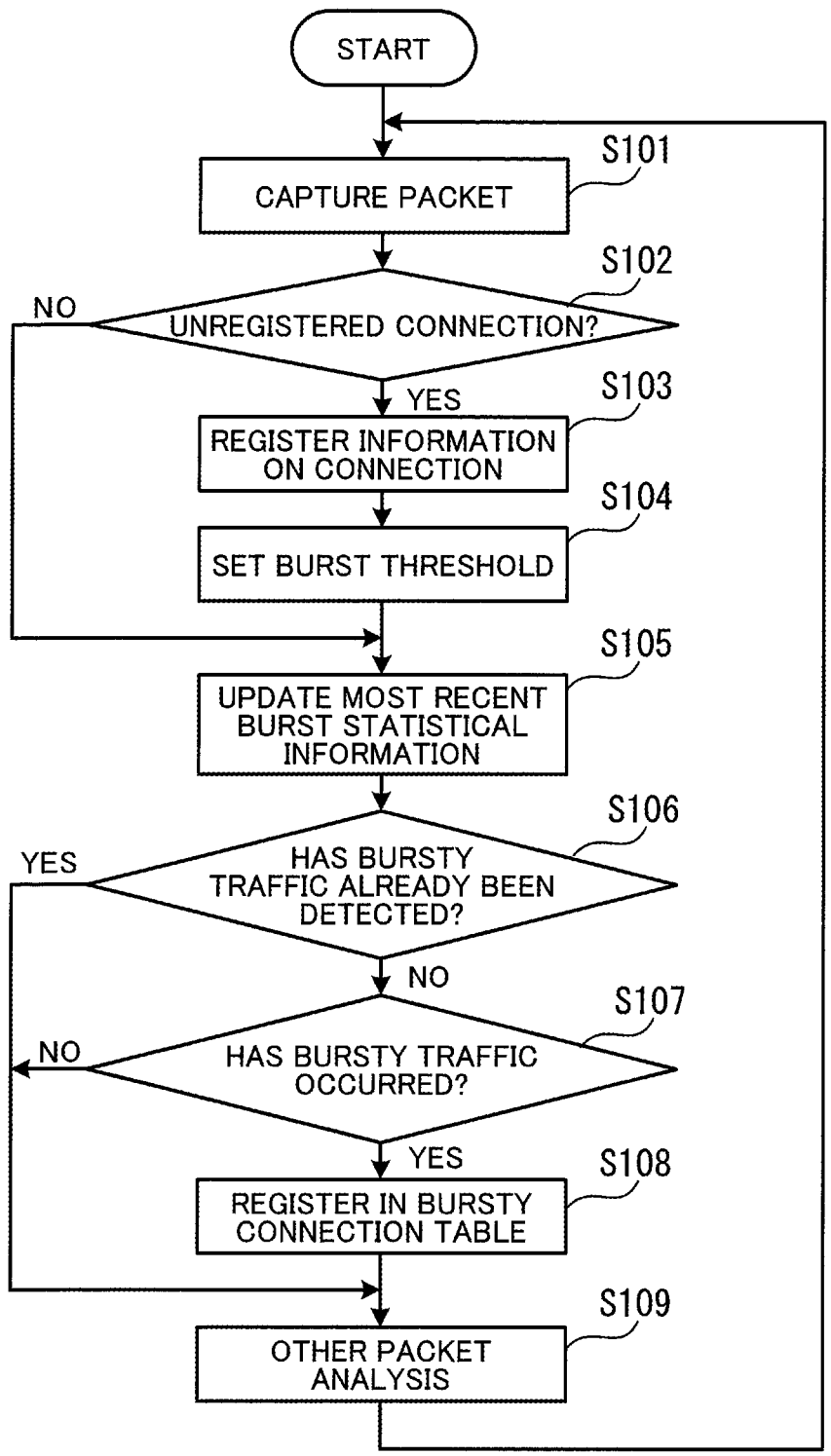
FIG. 9 is a flowchart illustrating an exemplary procedure for performing an analysis process.

FIG. 9 is a flowchart illustrating an exemplary procedure for performing an analysis process.

(Step S101) The communication interface 161 captures a packet. This packet capturing initiates an analysis process for each packet. The captured packet is given to the connection management unit 162.

(Step S102) The connection management unit 162 determines whether or not the captured packet is a packet communicated through a connection that is not registered. For example, the connection management unit 162 compares the header information of the captured packet with the registered information of the connection management table 111. Then, the connection management unit 162 determines whether or not the connection management table 111 contains information on a connection for communication that is performed by a combination of two nodes that communicated the captured packet and that uses the same protocol. At this time, information on a connection that communicated the captured packet is found, regardless of which node is a transmission source and which node is a transmission destination. If information on such a connection is not found, the captured packet is determined to have been transferred through a connection that is not registered. If the packet is determined to have been communicated through an unregistered connection, the process proceeds to step S103. If the packet is determined to have been communicated through a registered connection, the connection management unit 162 classifies the captured packet into the corresponding connection, and the process proceeds to step S105.

(Step S103) Since the packet was determined to have been communicated through an unregistered connection, the connection management unit 162 additionally registers a new record indicating information on the connection for the received packet in the connection management table 111. At this time, the analysis unit 163 receives the connection ID of the new connection from the connection management unit 162 and adds the new record corresponding to the connection ID to the statistical information table 121.

(Step S104) The analysis unit 163 sets a burst threshold for the newly recognized connection. For example, the analysis unit 163 compares the information on the newly recognized connection (the header information of the packet) with the conditions set in the exceptional threshold table 112. If there are matching conditions, the analysis unit 163 determines the exceptional threshold corresponding to the conditions as the burst threshold for the newly recognized connection. If there are no matching conditions, the analysis unit 163 determines a default burst threshold set in the global control table 122 as the burst threshold for the newly recognized connection. In the case where the exceptional threshold is determined as the burst threshold, the analysis unit 163 copies the value of the determined exceptional threshold to the burst threshold field for the newly recognized connection in the statistical information table 121. In the case where the default burst threshold is determined as the burst threshold, the analysis unit 163 sets a value "−1" indicating the default burst threshold in the burst threshold field for the newly recognized connection in the statistical information table 121.

By doing so, basically, the default threshold stored in the global control table 122 is used as a burst threshold. However, with respect to connections whose burst statistical information is always to be obtained or connections whose burst statistical information does not need to be obtained at all, an exceptional threshold previously set in the exceptional threshold table 112 is used as a burst threshold. For example, there is a case where, assuming that a variable value used for abnormality detection is the number of packets or the number of bytes, an abnormality is determined to have occurred if the variable value exceeds a burst threshold. In this case, by setting an exceptional threshold to "0", it is possible to always obtain burst statistical information. On the other hand, by setting the exceptional threshold to the maximum value of the variable, no burst statistical information is registered in any traffic state.

(Step S105) The analysis unit 163 updates the most recent burst statistical information corresponding to the current burst statistical cycle out of the burst statistical information generated at every burst statistical cycle (T (milliseconds)) (T is a positive real number). For example, the analysis unit 163 confirms the last measurement time set in the global control table 122. The analysis unit 163 also confirms the last packet arrival time with respect to the connection that communicated the received packet, with reference to the statistical information table 121. If the last packet arrival time is prior to the last measurement time, the analysis unit 163 resets the burst registration flag corresponding to the connection in question to "0" in the statistical information table 121.

Then, the analysis unit 163 determines based on the value of the write side in the global control table 122 which records to update in the most recent burst statistical information. For example, in the case where the value of the write side is "1", the analysis unit 163 updates the information of the records with a control side ID of "1". For example, when a packet from a client to a server is received, the analysis unit 163 updates the number of packets (C→S packet count) and the number of bytes (C→S byte count) with respect to transmission from the client to the server. In this connection, if a packet loss is detected by analyzing the sequence number of the packet or the like, the analysis unit 163 updates the number of lost packets (C→S loss count) with respect to the packets transmitted from the client to the server. In addition, in the case where a packet from the server to the client is received, the analysis unit 163 updates the number of packets (S→C packet count) and the number of bytes (S→C byte count) with respect to transmission from the server to the client. If a packet loss is detected by analyzing the sequence number of the packet or the like, the analysis unit 163 updates the number of lost packets (S→C loss count) with respect to the packets transmitted from the server to the client.

Then, through steps S106 to S108, it is determined whether or not bursty traffic has occurred in the connection (hereinafter, referred to as analysis target connection) that communicated the received packet.

(Step S106) The analysis unit 163 determines whether occurrence of bursty traffic has already been detected in the analysis target connection or not. For example, the analysis unit 163 refers to the value of the burst registration flag in the statistical information table 121, and makes the determination. A burst registration flag of "0" indicates that the bursty traffic has not yet been detected. A burst registration flag of "1" indicates that the bursty traffic has already been detected. If the bursty traffic has not yet been detected, the process proceeds to step S107. If the bursty traffic has already been detected, the process proceeds to step S109.

(Step S107) Since an abnormality has not yet been detected, the analysis unit 163 then determines whether bursty traffic has occurred in the analysis target connection or not. For example, if a threshold used for this determination is "0" or greater, the analysis unit 163 uses the threshold as it is. If the threshold used for the determination is "−1", the analysis unit 163 uses a default threshold set in the global control table 122. For example, assuming that a threshold for the number of bytes transmitted and received is set as a burst threshold, bursty traffic is detected if the following inequality (1) is satisfied.

$$(C{\to}S\ byte\ count)+(S{\to}C\ byte\ count)>(burst\ threshold) \qquad (1)$$

In this connection, a threshold for a network quality other than the number of bytes may be used as a burst threshold. If bursty traffic in the analysis target connection is detected, the process proceeds to step S108. If no bursty traffic is detected, the process proceeds to step S109.

(Step S108) Since bursty traffic was detected, the analysis unit 163 registers the analysis target connection in the bursty connection table 141. For example, the analysis unit 163 registers the connection ID of the analysis target connection in association with the value of the write side of the global control table 122 in the bursty connection table 141. After that, in order to eliminate the necessity of making the bursty traffic detection all over again, the analysis unit 163 sets a burst registration flag for the analysis target connection to "1" in the statistical information table 121. Then, the determination on whether bursty traffic has occurred or not, made by the analysis unit 163, is completed, and then the process proceeds to step S109.

(Step S109) The analysis unit 163 conducts packet analysis other than the bursty traffic detection. For example, the analysis unit 163 estimates network quality, such as detecting a packet loss, estimating a packet delay time, estimating a network band, etc. Then, the process proceeds back to step S101.

As described above, when each packet is captured, statistical information is registered and the bursty traffic detection is conducted. Then, a burst statistical process is performed at every burst statistical cycle.

Figure 10:
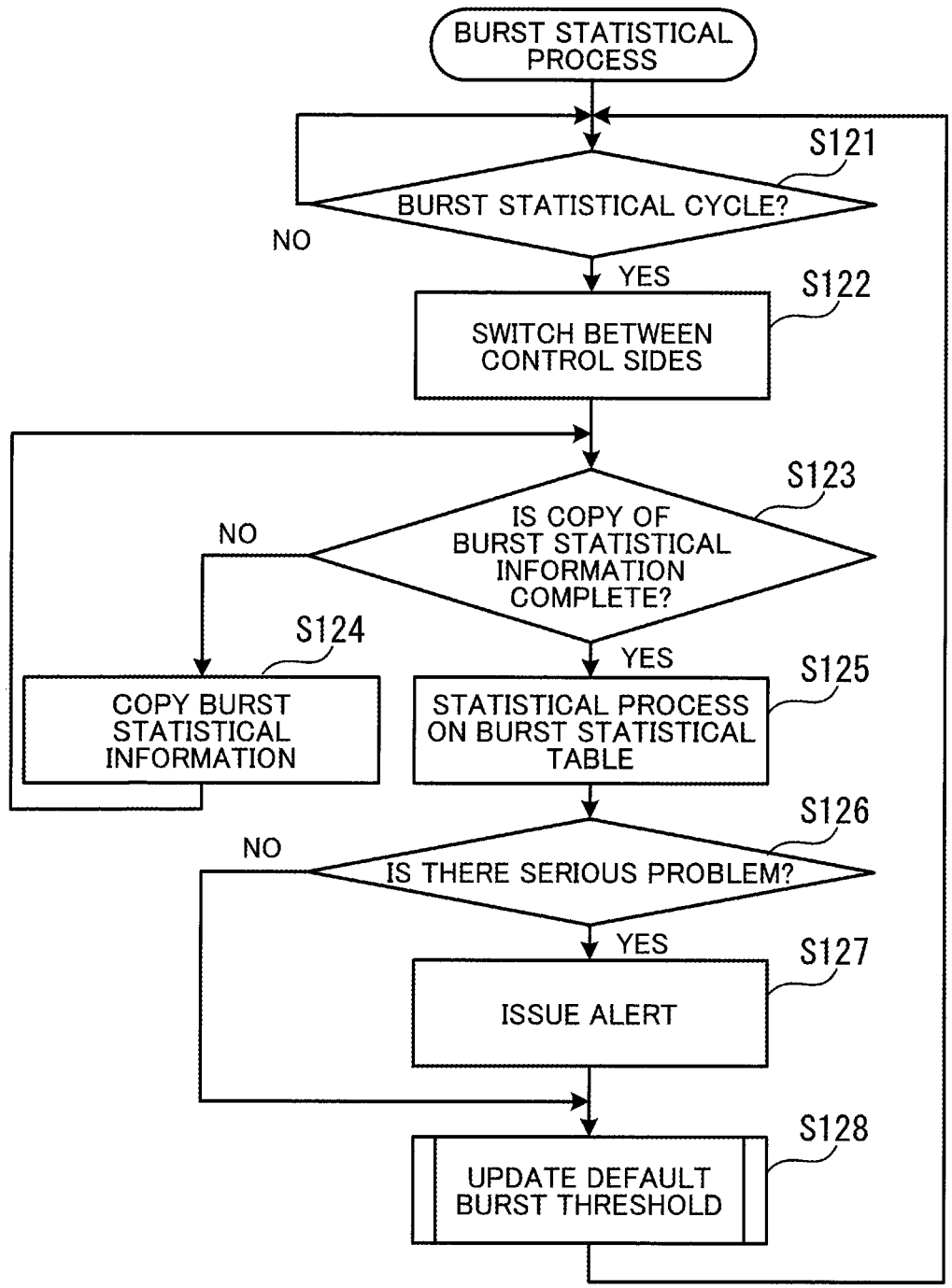
FIG. 10 is a flowchart illustrating an exemplary procedure for performing a burst statistical process.

FIG. 10 is a flowchart illustrating an exemplary procedure for performing a burst statistical process.

(Step S121) The burst statistical processing unit 165 determines whether a burst statistical cycle T (milliseconds) has passed since the last execution of the burst statistical process or not. If the burst statistical cycle has passed, the process proceeds to step S122. If the burst statistical cycle has not passed, then step S121 is repeated.

(Step S122) The burst statistical processing unit 165 switches between the roles of the control sides. For example, in the case where there are two control sides, i.e., a front side and a back side, the burst statistical processing unit 165 switches between the write side and the read side. That is to say, the control side that served as a write side now serves as a read side, and the control side that served as a read side now serves as a write side. More specifically, the burst statistical processing unit 165 changes the value of the write side and the value of the read side in the global control table 122. By switching between the write side and the read side for the burst statistical information in this way, it is possible to prevent the data of written burst statistical information from being updated before being copied and to ensure data consistency. In this mechanism, the data consistency is ensured for a time period calculated with the following equation (2).

$$\text{(the number of control sides}-1)\times\text{Burst statistical cycle }(T\ [\text{milliseconds}]) \qquad (2)$$

In this connection, at the time of switching between the control sides, the values of the variables (the number of packets, the number of bytes, the number of lost packets, etc.) corresponding to the control side serving as a read side in the short-time storage tables 121-1, 121-2, . . . , are initialized by the burst statistical processing unit 165. For example, the values in the packet count, byte count, and loss count fields are changed to "0".

(Step S123) The burst statistical processing unit 165 determines whether the copy of all burst statistical information is complete or not. For example, the burst statistical processing unit 165 obtains the connection IDs corresponding to the control side ID of a read side in the plurality of bursty connection tables 141. Then, the burst statistical processing unit 165 determines whether the copy of the burst statistical information is complete or not, with respect to all of the connections identified by the obtained connection IDs. If there is any connection whose burst statistical information has not been copied, the process proceeds to step S124. If all of the burst statistical information have been copied, the process proceeds to step S125.

(Step S124) The burst statistical processing unit 165 selects one piece of the burst statistical information that has not been copied, and makes a copy of the selected burst statistical information. For example, the burst statistical processing unit 165 reads the selected burst statistical information from the statistical information table 121 and stores the read burst statistical information in the burst statistical information table 131. Then, the process proceeds to step S123.

Through steps S123 and S124, the burst statistical information on all the connections in which bursty traffic was detected is copied to the burst statistical information table 131. In this connection, the burst statistical information table 131 has as much storage space as needed for storing burst statistical information generated in the basic statistical cycle.

In this connection, as described earlier, data consistency is ensured for the time period calculated with the equation (2). That is to say, if the copy of the burst statistical information is completed within the time period, data inconsistency does not occur. In the case where the amount of burst statistical information increases too much, the amount of burst statistical information is reduced by updating the default burst threshold through an update process, which will be described later, in order to thereby ensure the data consistency.

(Step S125) When the copy of the burst statistical information is completed, the burst statistical processing unit 165 performs a statistical process on data corresponding to the time period of T [milliseconds]. In the statistical process, the number of pieces of burst statistical information (equal to the number of connections in which bursty traffic was detected) registered during, for example, the time period of T [milliseconds] is counted. In addition, in the statistical process, an idea of sorting the burst statistical information pieces in terms of a variable used for detecting bursty traffic (for example, the number of bytes transmitted and received) may be considered. By sorting the burst statistical information pieces, for example, the burst statistical information pieces are ranked according to a degree of abnormality.

(Step S126) When the statistical process is completed, the burst statistical processing unit 165 determines whether or not there is a serious problem with the connections in which the abnormality was detected this time. Whether there is a serious problem or not is determined based on whether a rate of packet loss is greater than or equal to a predetermined value or not. Referring to the example of FIG. 7, a packet loss of 10% occurred in a connection with a connection ID "1" during the first measurement time period in the packet transmission from a server to a client. The packet loss as high as 10% is a serious problem. If a serious problem has occurred, the process proceeds to step S127. If there is no serious problem, the process proceeds to step S128.

(Step S127) Since a serious problem has occurred, the burst statistical processing unit 165 issues an alert. For example, the burst statistical processing unit 165 issues the following alert signal immediately to make a notification of network quality degradation: "Warning!! Packet loss has occurred in large quantities. s_time=0, e_time=10, proto=TCP, s_ip=192.168.3.100, d_ip=192.168.4.100, s_port=443, d_port=400, c2s_cnt=20, c2s_byte=2000, c2s_loss=0, s2c_cnt=50, s2c_byte=60000, s2c_loss=5".

The issued alert is displayed, for example, on the monitor 21 of the network monitoring apparatus 100. This allows the administrator to recognize the problem immediately.

(Step S128) The burst processing unit 165 updates the default burst threshold. After that, the burst statistical processing unit 165 rewrites the last measurement time in the global control table 122, and then the process proceeds back to step S121.

The following describes how to update a default burst threshold in detail.

Figure 11:
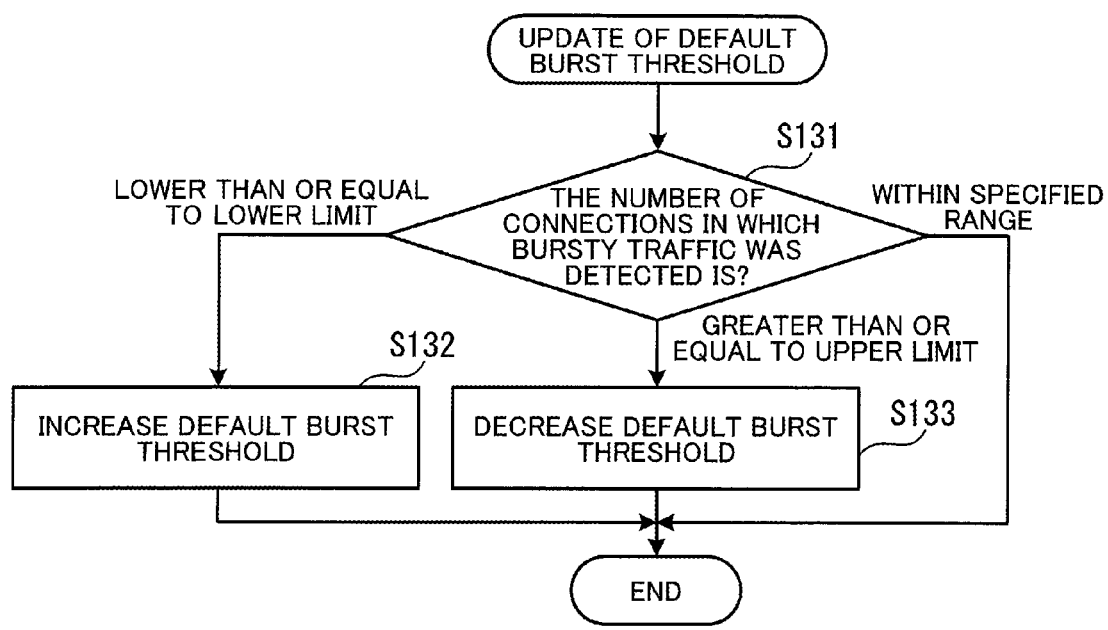
FIG. 11 is a flowchart illustrating a procedure for performing an update process of updating a default burst threshold.

FIG. 11 is a flowchart illustrating a procedure for performing an update process of updating a default burst threshold.

(Step S131) The burst statistical processing unit 165 compares the number of connections in which bursty traffic was detected with a specified range. As the specified range, an upper limit and a lower limit are specified. The upper limit of the specified range is set, for example, based on the limit of the storage area for storing burst statistical information. The lower limit of the specified range is set, for example, based on the number of ranks to be output. For example, in the case where the top 200 burst statistical information pieces are to be output, the lower limit is set to 200. The specified range may be set, for example, based on the time period during which data consistency is ensured, calculated with the equation (2). That is, the upper limit of the number of burst statistical information pieces that are able to be copied within the time period during which data consistency is ensured is set as the upper limit of the specified range.

If the number of connections in which bursty traffic was detected is lower than or equal to the lower limit of the specified range, the process proceeds to step S132. If the number of connections in which bursty traffic was detected is greater than or equal to the upper value of the specified range, the process proceeds to step S133. Further, the number of connections in which bursty traffic was detected falls within the specified range (greater than the lower limit and lower than the upper limit), the process is completed.

(Step S132) Since the number of connections in which bursty traffic was detected is equal to or lower than the lower limit of the specified range, the burst statistical processing unit 165 increases the default burst threshold, and then the process is completed. In the case where there are too few connections registered in the bursty connection table, the default burst threshold is changed such as to relax the bursty traffic detection criterion, thereby increasing the number of connections registered. For example, with the following equation (3), the default burst threshold is changed to be one to two times of the current value.

$$TSdef = (1 + (N\min - x)/N\min) \times TSdef \quad (3),$$

where Tsdef denotes a default burst threshold, Nmin denotes the number of connections to be output, and x denotes the number of connections actually registered.

(Step S133) Since the number of connections in which bursty traffic was detected is equal to or greater than the upper limit of the specified range, the burst statistical processing unit 165 decreases the default burst threshold, and then the process is completed. In the case where there are too many connections registered in the bursty connection table, the default burst threshold is changed such as to tighten the bursty traffic detection criterion, thereby decreasing the number of connections registered.

For example, the burst statistical processing unit 165 refers to the result of sorting connections in which bursty traffic was detected in terms of the variable value used for detecting bursty traffic (for example, the amount of data transmitted). The burst statistical processing unit 165 identifies a connection ranked on the lower limit of the specified range and a connection ranked on the upper limit thereof with reference to the sorting result. Then, the burst statistical processing unit 165 sets the variable value of a connection ranked in the middle between the lower limit rank and the upper limit rank, as a default burst threshold. This is a median value of the variable values for a set of connections whose ranks fall within a range from the lower limit to the upper limit after the sort. For example, it is assumed that a variable used for detecting bursty traffic is an amount of packet transfer, the top 200 connections are to be output, and 1000 connections at maximum are recordable for each burst statistical cycle of 10 milliseconds. In this case, out of the connections sorted in descending order of the amount of packet transfer, an amount of transfer of a connection that is ranked in the middle between the 200th and 1000th positions, that is, ranked in the 600th position is set as a default burst threshold.

As described above, it is possible to extract an appropriate number of burst statistical information pieces and conducts statistical analysis. That is to say, the number of connections in which bursty traffic is detected varies depending on the state of traffic. If there are too many connections detected, more memory is used, so that the memory space runs out and the program may be hung up. In addition, in the case where a narrow-band network is monitored, there is a possibility that no connection is detected as an abnormal connection even if the bands are under stringency conditions. To deal with this, a default threshold is appropriately changed based on the number of connections registered in the bursty connection table, so as to suppress a variation in the number of connections in which bursty traffic is detected.

As described above, according to the second embodiment, it is possible to obtain statistical information at a short cycle and also obtain statistical information at a long cycle, efficiently, and to detect occurrence of bursty traffic.

If the basic statistical process is performed to detect burst traffic, statistical information is gathered in, for example, Comma Separated Values (CSV) file at an interval of milliseconds and is then stored in a database. The database is stored in the HDD. Considering the characteristics of computers, access to an HDD needs more time than that to a memory, and more access to the HDD imposes more processing load. Therefore, it is difficult to store the statistical information that is to be processed in the basic statistical process, in the database at the interval of milliseconds.

If it is not possible to write statistical information on the HDD, the statistical information may be stored in a memory. For example, consider the case where the basic statistical cycle and a cycle for writing statistical information in a database are both set to one minute, and the burst statistical cycle is set to 10 milliseconds. In this case, the memory needs to store 6000 times as much data as the statistical information stored for the basic statistical process. However, it is not possible to store 6000 times as much data as the existing data in the memory of a single computer.

In this connection, there is an idea of creating a burst statistics-dedicated table optimized for statistical information used for detecting bursty traffic, separately from the statistical information table used for the existing packet analysis, in the memory. In this idea, however, when each packet arrives, access is made to both the existing statistical information table for storing statistical information and the burst statistics-dedicated table in order to store statistical information. Considering the characteristics of computers, it takes time to access a plurality of discontinuous memory areas. Therefore, storing the statistical information in a plurality of tables degrades processing performance. To improve the efficiency of the memory access, an idea of conducting packet analysis by separately performing an existing process for storing statistical information and a process for detecting bursty traffic in parallel may be considered. However, for storing statistical information for each connection, packets need to be classified into connections. If this classification is done for each process independently, the amount of processing increases, which ends up degrading the processing efficiency.

In the second embodiment, only one statistical information table 121 is accessed for writing statistical information when each packet is captured. This streamlines the processing.

Figure 12:
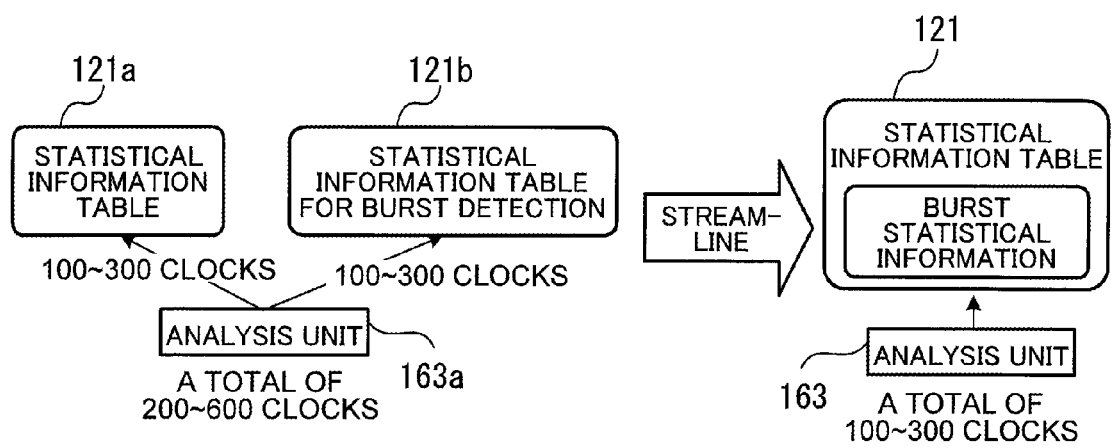
FIG. 12 is a view for explaining a difference in processing efficiency between application and non-application of the processing presented by the second embodiment.

FIG. 12 is a view for explaining a difference in processing efficiency between application and non-application of the processing presented by the second embodiment. FIG. 12 illustrates, on its left side, an example in which statistical information tables 121a and 121b for different statistical cycles at which a statistical process is performed are provided. FIG. 12 illustrates, on its right side, an example in which only the statistical information table 121 is provided.

In the case where the statistical information tables 121a and 121b for different statistical cycles at which a statistical process is performed are provided, an analysis unit 163a, which writes statistical information, writes statistical information in both the statistical information tables 121a and 121b when each packet is captured. For example, even if the statistical information tables 121a and 121b are stored in the memory, it takes 100 to 300 clocks, which are operational clocks of the CPU, per write. Therefore, it takes 200 to 600 clocks to complete the writing in the two statistical information tables 121a and 121b.

On the other hand, in the second embodiment, burst statistical information is part of the whole statistical information. Therefore, the analysis unit 163 may collectively write the statistical information used for the basic statistical process and the statistical information for the burst statistical process in the statistical information table 121 stored in the memory. By providing the single statistical information table 121 as a write destination of statistical information, the analysis unit 163 is able to complete the writing within 100 to 300 clocks. This results in reducing the time taken for the writing by half.

In this connection, in addition to the burst statistical information, statistical information used for the basic statistical process, which is performed per minute, is also written in the statistical information table 121. Therefore, basically, the statistical information for one minute is stored in the statistical information table 121, and is rewritten with statistical information for the new statistical cycle every minute. However, storing the burst statistical information for one minute as well as the statistical information leads to storing an enormous amount of data. To deal with this, in the second embodiment, burst statistical information is copied to another area every 10 milliseconds, and the burst statistical information in the statistical information table 121 is updated every 10 milliseconds. This saves the storage area for the burst statistical information in the statistical information table 121.

Figure 13:
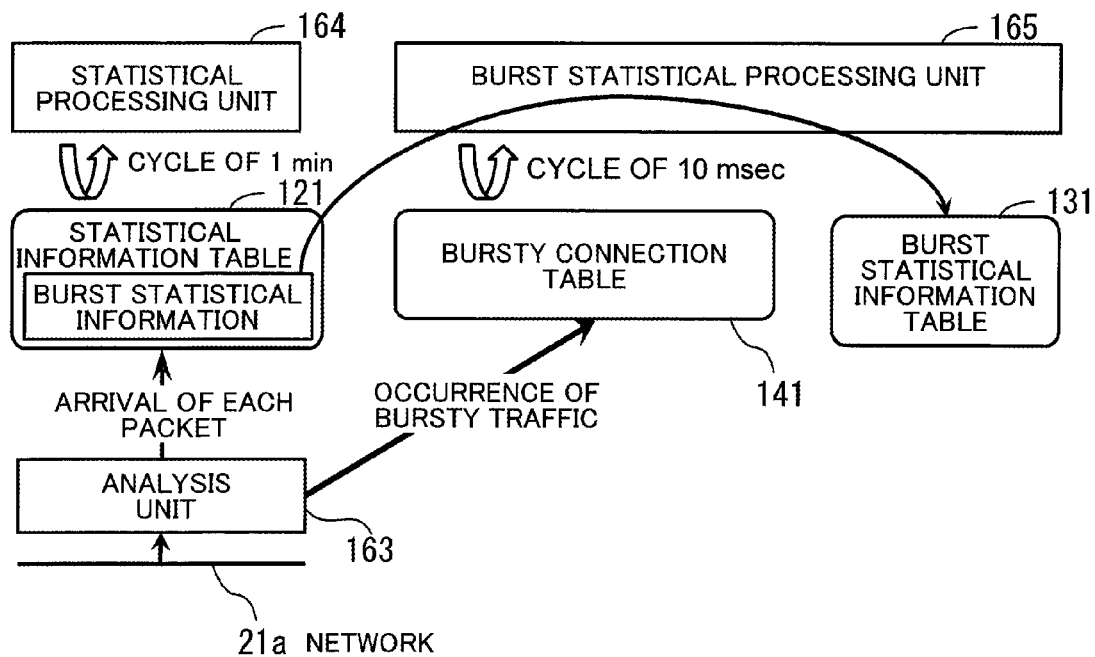
FIG. 13 illustrates an example of an operation for copying burst statistical information.

FIG. 13 illustrates an example of an operation for copying burst statistical information. While packets communicated via the switch 20 over the network 21a are captured, the analysis unit 163 stores statistical information in the statistical information table 121 when each packet arrives. At this time, the analysis unit 163 detects bursty traffic on the basis of a variable value, such as the amount of data transfer indicated in the burst statistical information. Then, if bursty traffic is detected, the analysis unit 163 registers the connection ID of a connection in which the bursty traffic has occurred, in the bursty connection table 141.

As the statistical process, the statistical processing unit 164 performs the basic statistical process, for example, at every cycle of one minute, and outputs the result of the statistical process to the processing result database 150. The processing result database 150 is stored in the HDD 103, for example. Although it takes time to write on the HDD 103, writing at every cycle of one minute does not have much adverse effect on the entire processing efficiency.

On the other hand, the burst statistical process is performed by the burst statistical processing unit 165, for example, at every cycle of 10 milliseconds. At this time, the burst statistical processing unit 165 copies only the burst statistical information on connections in which bursty traffic has occurred to the burst statistical information table 131, with reference to the bursty connection table 141. Then, using the copy of the burst statistical information stored in the burst statistical information table 131, the burst statistical processing unit 165 performs the burst statistical process to determine, for example, whether there is a serious problem or not.

As described above, copying the burst statistical information every 10 milliseconds minimizes an increase in the storage capacity of the statistical information table 121. In addition, copying only burst statistical information on connections in which bursty traffic has occurred minimizes the amount of data to be copied and improves the processing efficiency.

Further, in the second embodiment, in the case where a serious problem is detected, an alert is issued immediately. Such immediate issuance of alert is more and more of importance with an improvement in the virtualization technology for servers. That is to say, in recent years, following the server virtualization, network virtualization technologies have been introduced, which allow network setting to be dynamically changed according to the communication state. For example, there is an OpenFlow (a network control technology proposed by OpenFlow Switching Consortium). Previously, the network setting is done manually by network administrators. Therefore, abnormality detection and notification at an interval of one minute is sufficient. However, in the case where the network setting is dynamically controlled, an interval of one minute is too long for the abnormality detection and notification. The second embodiment makes it possible to perform the abnormality detection and notification at every cycle of about 10 milliseconds, thereby enabling a very fast abnormality notification.

By the way, as illustrated on the right side of FIG. 12, in directly accessing the burst statistical information in the statistical information table 121 and performing the burst statistical process, the statistical information table 121 is accessed from a plurality of different functions. For example, the analysis unit 163, the burst statistical processing unit 165, and the statistical processing unit 164 that outputs the result of the statistical process in CSV to the processing result database 150 make access to the statistical information table 121 for read or write. If different functions perform data read and write on the same table, data may be rewritten while the data is read, which may fail to ensure data consistency.

Especially, in systems that need to ensure data consistency, such as the Automated Teller Machines (ATMs) of banks, a lock function is used so as to allow only one process to access data. While reading or writing is performed, the lock function prevents the other processes from accessing data. Such access control using the lock function ensures data consistency. However, while the lock function limits access, the other processes are interrupted, thereby remarkably degrading the processing performance.

Recent networks are able to realize 100 Gbps communication. In the case of monitoring such a high-speed communication network, if processes are interrupted while access is limited, the processes end too late, which prevents the network quality from being estimated.

To deal with this, in the second embodiment, a plurality of control sides is provided as storage areas for storing burst statistical information in the statistical information table 121, and the burst statistical information is stored in one of the control sides, in turn every 10 milliseconds. This makes it possible to ensure data consistency, without the need of using the lock mechanism.

Figure 14:
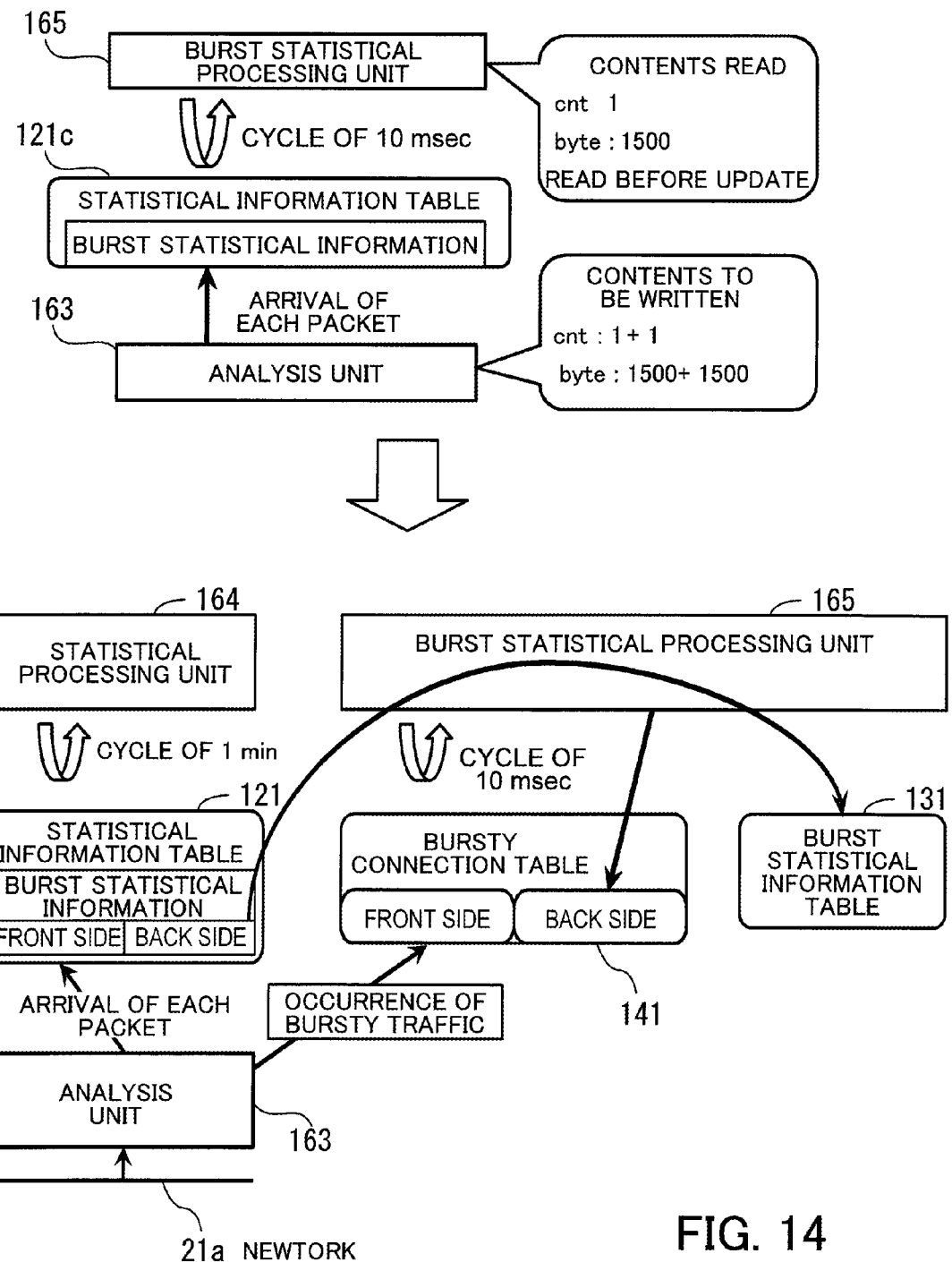
FIG. 14 illustrates an example of a process for preventing data inconsistency.

FIG. 14 illustrates an example of a process for preventing data inconsistency. FIG. 14 illustrates, on its upper side, occurrence of data inconsistency, and on its lower side, a process for preventing data inconsistency.

First, the occurrence of data inconsistency will be described. For example, it is assumed that only an area for storing burst statistical information for a single burst statistical cycle is provided in a statistical information table 121c. In this case, the analysis unit 163 updates the values in the storage area for the burst statistical information in the statistical information table 121c when each packet arrives. For example, the number of transferred packets is counted up and a value indicating the amount of transferred data is increased by the length of newly transferred data. On the other hand, the burst statistical processing unit 165 reads burst statistical information from the storage area for storing burst statistical information in the statistical information table at every cycle of 10 milliseconds. At this time, if the burst statistical processing unit 165 reads the burst statistical information immediately before the analysis unit 163 updates the burst statistical information, the read burst statistical information is yet to be updated. Immediately thereafter, without the lock mechanism employed, the analysis unit 163 updates the burst statistical information. This causes inconsistency between the burst statistical information read by the burst statistical processing unit 165 and the burst statistical information updated by the analysis unit 163. In addition, after reading the burst statistical information, the burst statistical processing unit 165 initializes the burst statistical information in the statistical information table 121c so as to allow burst statistical information for the next burst statistical cycle to be stored. As a result, the information regarding a packet obtained last by the analysis unit 163 is not reflected on the burst statistical information of any cycle.

To deal with this, in the second embodiment, a plurality of control sides is provided as storage areas for storing burst statistical information. Referring to an example of FIG. 14, there are two control sides, i.e., the front side and the back side. When a packet arrives, the analysis unit 163 writes burst statistical information on one control side (for example, the front side). During the writing, the burst statistical processing unit 165 reads burst statistical information stored during the previous burst statistical cycle from the other control side (for example, the back side), and then writes it in the burst statistical information table 131. In this way, it is possible to prevent the analysis unit 163 and the burst statistical processing unit 165 from accessing the same burst statistical information in the same time period. As a result, inconsistency of burst statistical information is prevented.

In addition, the analysis unit 163 writes the connection IDs of connections in which bursty traffic has occurred, in association with a control side (for example, the front side) currently serving as a write side for writing burst statistical information, in the bursty connection table 141. Then, the burst statistical processing unit 165 refers to the bursty connection table 141, and determines which burst statistical information to read, based on the connection IDs registered in association with the control side (for example, the back side) serving as a read side from which burst statistical information is to be read. In this way, in the bursty connection table 141, the connection IDs of connections in which bursty traffic has occurred are managed in association with control sides. As a result, in the case of providing a plurality of control sides, it is possible to properly read only the burst statistical information on connections in which bursty traffic has occurred from an appropriate control side.

Heretofore, the embodiments have been exemplified. However, the components described in the embodiments may be replaced with other components having equivalent functions or other components or processing operations may be added. In addition, desired two or more configurations (features) in the embodiments may be combined.

According to one aspect, it is possible to efficiently obtain statistical information at a plurality of different cycles.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
   updating, upon detecting each packet communicated via connections established through a network, statistical information indicating a communication state of each of the connections for a first cycle, the statistical information being stored for each of the connections in a continuous storage area of a memory, the statistical information including first statistical information and second statistical information different from the first statistical information;
   reading the first statistical information and the second statistical information simultaneously from the memory at every first cycle, and processing the statistical information and initializing the statistical information in the memory;
   detecting bursty traffic in communication on each of the connections; and
   reading the first statistical information on a connection in which bursty traffic is detected from the memory at every second cycle, and processing the first statistical information and initializing the first statistical information in the memory, the second cycle being shorter than the first cycle.

2. The non-transitory computer-readable storage medium according to claim 1, wherein the reading the first statistical information includes copying the read first statistical information to another storage area different from the continuous storage area, and processing a copy of the first statistical information.

3. The non-transitory computer-readable storage medium according to claim 1, wherein the detecting the bursty traffic in communication includes comparing a variable value indicated in the first statistical information on each connection with a threshold to determine whether the abnormality has occurred or not.

4. The non-transitory computer-readable storage medium according to claim 3, wherein the process further includes changing the threshold according to a number of connections in which the bursty traffic was detected.

5. The non-transitory computer-readable storage medium according to claim 1, wherein:
   the statistical information includes first statistical information for a current second cycle and first statistical information for a past most recent second cycle;
   the updating statistical information includes updating the first statistical information corresponding to the current second cycle; and
   the reading the first statistical information includes reading the first statistical information corresponding to the past most recent second cycle.

6. The non-transitory computer-readable storage medium according to claim 1, wherein the process further includes, when a failure is detected in communication on the network as a result of processing the first statistical information, issuing a warning message.

7. An analysis method comprising:
   updating, upon detecting each packet communicated via connections established through a network, by a processor, statistical information indicating a communication state of each of the connections for a first cycle, the statistical information being stored for each of the connections in a continuous storage area of a memory, the statistical information including first statistical information and second statistical information different from the first statistical information;
   reading, by the processor, the first statistical information and the second statistical information simultaneously from the memory at every first cycle, and processing the statistical information and initializing the statistical information in the memory;
   detecting, by the processor, bursty traffic in communication on each of the connections; and
   reading, by the processor, the first statistical information on a connection in which bursty traffic is detected from the memory at every second cycle, and processing the first statistical information and initializing the first statistical information in the memory, the second cycle being shorter than the first cycle.

8. An analysis apparatus comprising:
   a memory; and
   a processor coupled to the memory and configured to perform a process including:
   updating, upon detecting each packet communicated via connections established through a network, the statistical information indicating a communication state of each of the connections for a first cycle, the statistical information being stored for each of the connections in a continuous storage area of the memory, the statistical information including first statistical information and second statistical information different from the first statistical information;
   reading the first statistical information and the second statistical information simultaneously from the memory at every first cycle, and processing the statistical information and initializing the statistical information in the memory;
   detecting bursty traffic in communication on each of the connections; and
   reading the first statistical information on a connection in which bursty traffic is detected from the memory at every second cycle, and processing the first statistical information and initializing the first statistical information in the memory, the second cycle being shorter than the first cycle.

* * * * *